(12) United States Patent
Zhang et al.

(10) Patent No.: US 12,489,594 B2
(45) Date of Patent: Dec. 2, 2025

(54) MIXED WAVEFORM COMMUNICATIONS

(71) Applicant: QUALCOMM Incorporated, San Diego, CA (US)

(72) Inventors: Danlu Zhang, San Diego, CA (US); Jing Jiang, San Diego, CA (US); Jun Ma, San Diego, CA (US); Seyedkianoush Hosseini, San Diego, CA (US); Wei Yang, San Diego, CA (US); Gabi Sarkis, San Diego, CA (US); Peter Gaal, San Diego, CA (US); John Edward Smee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 660 days.

(21) Appl. No.: 17/886,413

(22) Filed: Aug. 11, 2022

(65) Prior Publication Data

US 2024/0056271 A1     Feb. 15, 2024

(51) Int. Cl.
*H04L 5/00* (2006.01)
*H04L 27/26* (2006.01)

(52) U.S. Cl.
CPC .......... *H04L 5/0094* (2013.01); *H04L 5/0007* (2013.01); *H04L 5/0064* (2013.01); *H04L 5/0076* (2013.01); *H04L 5/0092* (2013.01); *H04L 27/2634* (2013.01)

(58) Field of Classification Search
CPC . H04B 1/3838; H04L 5/0051; H04L 25/0226; H04L 27/2614; H04L 27/2602; H04L 27/2636; H04W 72/20
See application file for complete search history.

(56) References Cited

U.S. PATENT DOCUMENTS

| | | | |
|---|---|---|---|
| 10,686,549 B2 | 6/2020 | Bayesteh et al. | |
| 11,133,970 B2 | 9/2021 | Gulati et al. | |
| 2018/0212810 A1* | 7/2018 | Park | H04L 27/2621 |
| 2020/0127787 A1* | 4/2020 | Nory | H04W 48/08 |
| 2022/0167425 A1* | 5/2022 | Lei | H04L 5/0091 |

OTHER PUBLICATIONS

International Search Report and Written Opinion—PCT/US2023/070708—ISA/EPO—Nov. 20, 2023.

\* cited by examiner

*Primary Examiner* — Iqbal Zaidi
(74) *Attorney, Agent, or Firm* — Holland & Hart LLP

(57) ABSTRACT

Methods, systems, and devices for wireless communications are described. A user equipment (UE) may receive an indication of a set of frequency domain resources allocated to the UE for communicating data over a wireless channel. The UE may receive an indication of a waveform type associated with the set of frequency domain resources. The waveform type may be based at least in part on a data type of the data, may be used for a defined amount of time, and may be one of a plurality of waveform types that are multiplexed together over different frequency domain resources within a total system bandwidth. The UE may communicate within the set of frequency domain resources according to the indicated waveform type and the data type.

13 Claims, 15 Drawing Sheets

MIXED WAVEFORM COMMUNICATIONS

FIELD OF TECHNOLOGY

The following relates to wireless communications, including mixed waveform communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may use a single waveform for communications. However, such approaches may be improved.

SUMMARY

The described techniques relate to improved methods, systems, devices, and apparatuses that support mixed waveform communications. For example, a user equipment (UE) may receive an indication of a set of frequency domain resources allocated to the UE for communicating data over a wireless channel. The UE may receive an indication of a waveform type associated with the set of frequency domain resources and the waveform type is based at least in part on a data type of the data, is to be used for a defined amount of time, and is one of a plurality of waveform types that are multiplexed together over different frequency domain resources within a total system bandwidth. The UE may communicate within the set of frequency domain resources according to the indicated waveform type and the data type.

A method for wireless communication at a user equipment (UE) is described. The method may include receiving an indication of a set of frequency domain resources allocated to the UE for communicating data over a wireless channel, receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and communicating within the set of frequency domain resources according to the indicated waveform type and the data type.

An apparatus for wireless communication at a UE is described. The apparatus may include a processor, memory coupled with the processor, and instructions stored in the memory. The instructions may be executable by the processor to cause the apparatus to receive an indication of a set of frequency domain resources allocated to the UE for communicating data over a wireless channel, receive an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and communicate within the set of frequency domain resources according to the indicated waveform type and the data type.

Another apparatus for wireless communication at a UE is described. The apparatus may include means for receiving an indication of a set of frequency domain resources allocated to the UE for communicating data over a wireless channel, means for receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and means for communicating within the set of frequency domain resources according to the indicated waveform type and the data type.

A non-transitory computer-readable medium storing code for wireless communication at a UE is described. The code may include instructions executable by a processor to receive an indication of a set of frequency domain resources allocated to the UE for communicating data over a wireless channel, receive an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and communicate within the set of frequency domain resources according to the indicated waveform type and the data type.

In some examples of the method, apparatuses, and non-transitory computer-readable medium described herein, and the method, apparatuses, and non-transitory computer-readable medium may include further operations, features, means, or instructions for receiving scheduling information associated with the direct sequence waveform type including a center frequency, a chip rate, a spreading factor, a data rate, or any combination thereof and communicating within the set of frequency domain resources according to the direct sequence waveform type and the scheduling information.

Some examples of the method, apparatuses, and non-transitory computer-readable medium described herein may further include operations, features, means, or instructions for processing a cyclic prefix associated with the direct sequence waveform type.

In some examples of the method, apparatuses, and non-transitory computer-readable medium described herein, the waveform type includes one or more of a distributed Fourier spread waveform type or an up-sampling waveform type.

Some examples of the method, apparatuses, and non-transitory computer-readable medium described herein may further include operations, features, means, or instructions for receiving the indication of the waveform type may be based on a peak to average power ratio metric associated with the UE.

In some examples of the method, apparatuses, and non-transitory computer-readable medium described herein, the set of multiple waveform types that may be multiplexed together over different frequency domain resources within the total system bandwidth includes a combination of one or more frequency domain processing-based waveforms and one or more time domain processing-based waveforms.

In some examples of the method, apparatuses, and non-transitory computer-readable medium described herein, a contiguous Fourier spread waveform, an orthogonal frequency domain multiple access waveform, a frequency modulated continuous wave waveform, or any combination thereof.

In some examples of the method, apparatuses, and non-transitory computer-readable medium described herein, a direct sequence waveform, a resource spread multiple access waveform, an up-sampling waveform, a distributed Fourier spread waveform, a constant envelope waveform, or any combination thereof.

In some examples of the method, apparatuses, and non-transitory computer-readable medium described herein, the one or more time domain processing-based waveforms occupy frequency domain resources located at an edge of the total system bandwidth.

In some examples of the method, apparatuses, and non-transitory computer-readable medium described herein, the set of frequency domain resources occupy an entirety of a bandwidth part.

In some examples of the method, apparatuses, and non-transitory computer-readable medium described herein, the set of frequency domain resources occupy a portion of a bandwidth part.

A method for wireless communication at a network entity is described. The method may include transmitting an indication of a set of frequency domain resources allocated to a UE for communicating data over a wireless channel, transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and communicating within the set of frequency domain resources according to the indicated waveform type and the data type.

An apparatus for wireless communication at a network entity is described. The apparatus may include a processor, memory coupled with the processor, and instructions stored in the memory. The instructions may be executable by the processor to cause the apparatus to transmit an indication of a set of frequency domain resources allocated to a UE for communicating data over a wireless channel, transmit an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and communicate within the set of frequency domain resources according to the indicated waveform type and the data type.

Another apparatus for wireless communication at a network entity is described. The apparatus may include means for transmitting an indication of a set of frequency domain resources allocated to a UE for communicating data over a wireless channel, means for transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and means for communicating within the set of frequency domain resources according to the indicated waveform type and the data type.

A non-transitory computer-readable medium storing code for wireless communication at a network entity is described. The code may include instructions executable by a processor to transmit an indication of a set of frequency domain resources allocated to a UE for communicating data over a wireless channel, transmit an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth, and communicate within the set of frequency domain resources according to the indicated waveform type and the data type.

In some examples of the method, apparatuses, and non-transitory computer-readable medium described herein, and the method, apparatuses, and non-transitory computer-readable medium may include further operations, features, means, or instructions for transmitting scheduling information associated with the direct sequence waveform type including a center frequency, a chip rate, a spreading factor, a data rate, or any combination thereof and communicating within the set of frequency domain resources according to the direct sequence waveform type and the scheduling information.

Some examples of the method, apparatuses, and non-transitory computer-readable medium described herein may further include operations, features, means, or instructions for processing a cyclic prefix associated with the direct sequence waveform type.

In some examples of the method, apparatuses, and non-transitory computer-readable medium described herein, the waveform type includes one or more of a distributed Fourier spread waveform type or an up-sampling waveform type.

Some examples of the method, apparatuses, and non-transitory computer-readable medium described herein may further include operations, features, means, or instructions for transmitting the indication of the waveform type may be based on a peak to average power ratio metric associated with the UE.

In some examples of the method, apparatuses, and non-transitory computer-readable medium described herein, the set of multiple waveform types that may be multiplexed together over different frequency domain resources within the total system bandwidth includes a combination of one or more frequency domain processing-based waveforms and one or more time domain processing-based waveforms.

In some examples of the method, apparatuses, and non-transitory computer-readable medium described herein, a contiguous Fourier spread waveform, an orthogonal frequency domain multiple access waveform, a frequency modulated continuous wave waveform, or any combination thereof.

In some examples of the method, apparatuses, and non-transitory computer-readable medium described herein, a direct sequence waveform, a resource spread multiple access waveform, an up-sampling waveform, a distributed Fourier spread waveform, a constant envelope waveform, or any combination thereof.

In some examples of the method, apparatuses, and non-transitory computer-readable medium described herein, the one or more time domain processing-based waveforms occupy frequency domain resources located at an edge of the total system bandwidth.

In some examples of the method, apparatuses, and non-transitory computer-readable medium described herein, the set of frequency domain resources occupy an entirety of a bandwidth part.

In some examples of the method, apparatuses, and non-transitory computer-readable medium described herein, the set of frequency domain resources occupy a portion of a bandwidth part.

DETAILED DESCRIPTION

In wireless communications, various waveforms may be used for communication with different devices. These various waveforms may be associated with differing characteristics, such as spectral efficiency, a peak to average power ratio (PAPR), link budge, power consumption, other characteristics, or any combination thereof. Communications in various scenarios may take advantage of these different characteristics or trade-offs between such characteristics. However, some approaches to the use of differing waveforms do not allow for mixing of multiple waveforms within a bandwidth of a wireless communications system.

As such, the approaches described herein involve the use of a mixed waveform for communications. A mixed waveform may be implemented as a combination of multiple waveforms mixed together in the same total bandwidth. For example, waveform types may include frequency domain processing-based waveforms and time domain processing-based waveforms using various approaches, such as direct sequence, RSMA, sequence repetition (e.g., Up-sampled DFT, or Distributed DFT-s-FDMA), constant envelope waveforms (e.g., GMSK, BT LE, MSK in Zigbee, MSK nonlinear modulations), contiguous DFT-s-FDMA, OFDMA, or FMCW. Different combinations of such waveforms may be multiplexed together over different frequency domain resources within a total bandwidth. In some examples, control signaling may be used to schedule the resources for the different waveforms (e.g., using different regions that are waveform-specific, optionally with guards around certain regions, such as those for time domain processing-based waveforms). In this way, wireless communications systems may achieve greater flexibility through the use of multiple or mixed waveforms to take advantage of different characteristics of such waveforms in different situations.

Aspects of the disclosure are initially described in the context of wireless communications systems. Aspects of the disclosure are then described in the context of a wireless communications system, processing schemes, and a process flow. Aspects of the disclosure are further illustrated by and described with reference to apparatus diagrams, system diagrams, and flowcharts that relate to mixed waveform communications.

Figure 1:
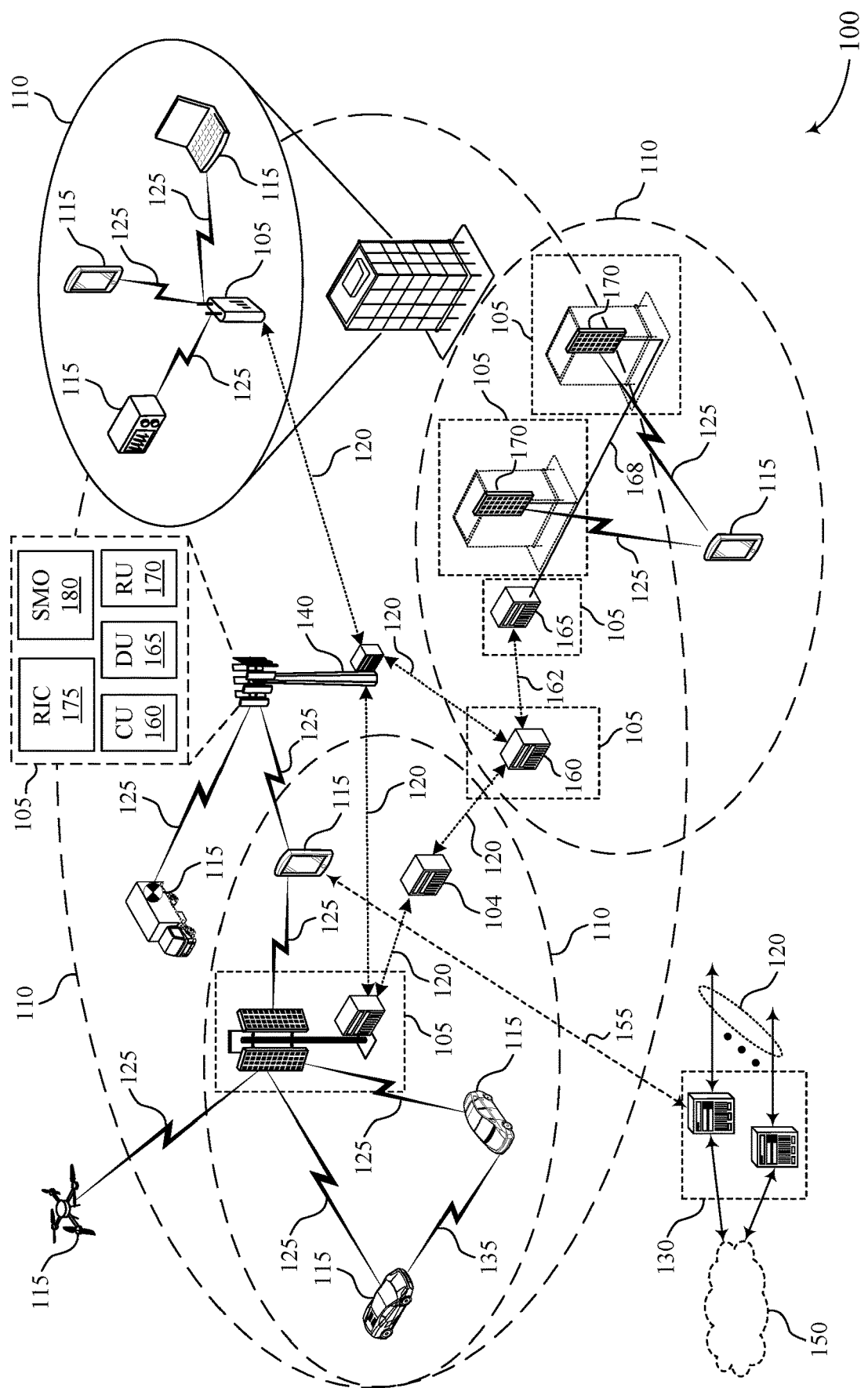
FIG. 1 illustrates an example of a wireless communications system that supports mixed waveform communications in accordance with one or more aspects of the present disclosure.

FIG. 1 illustrates an example of a wireless communications system 100 that supports mixed waveform communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be used between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be used between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support mixed waveform communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol).

In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be used across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 and a network entity 105 may support the use of multiple waveforms within a single total bandwidth for communications in a wireless communications system. For example, various devices within a wireless communications system may use different waveforms for communication all within a total bandwidth of a system. Such waveforms may include waveforms that are frequency domain-based, time domain-based, or both. The network entity 105, one or more other wireless devices, or any combination thereof, may determine or transmit scheduling parameters to schedule the use of such various waveforms for different devices, and such different devices may communicate using one or more different waveforms all within the same total bandwidth of the devices, the wireless communications system, or both.

Figure 2:
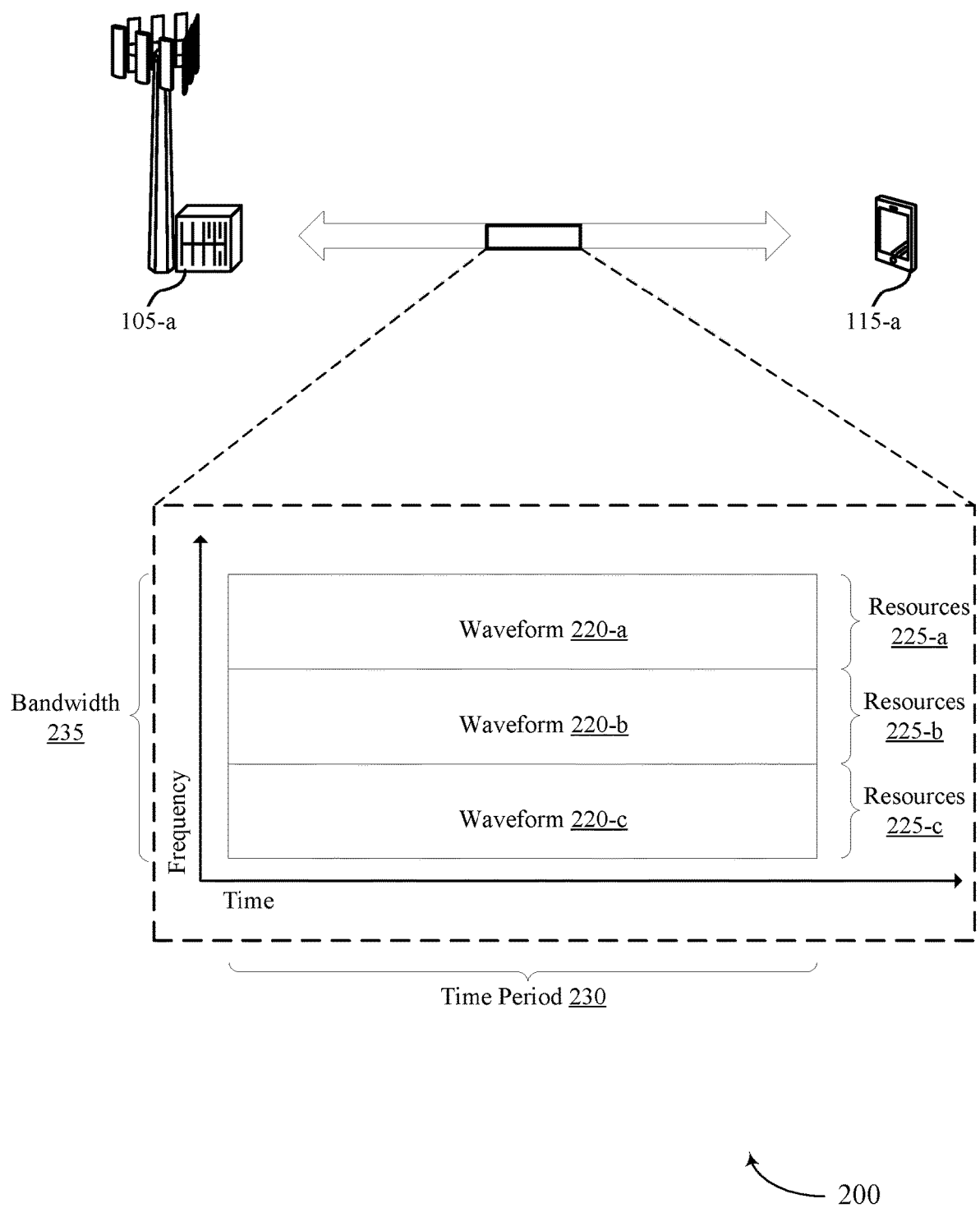
FIG. 2 illustrates an example of a wireless communications system that supports mixed waveform communications in accordance with one or more aspects of the present disclosure.

FIG. 2 illustrates an example of a wireless communications system 200 that supports mixed waveform communications in accordance with one or more aspects of the present disclosure. The wireless communications system 200 may involve the network entity 105-a that may be an example of one or more network entities discussed in relation to other figures. The wireless communications system 200 may involve the UE 115-a that may be an example of UEs discussed in relation to other figures.

In wireless communications, a waveform may refer to a signal whose energy is largely or completely constrained to a frequency bandwidth (e.g., an allocated bandwidth). A number of such waveforms have been adopted or studied for use in various aspects of wireless communications. These waveforms may have varying characteristics or advantages (e.g., spectral efficiency, PAPR, link budge, power consumption, different types of processing (e.g., time domain processing, frequency domain processing, spatial domain processing, or any combination thereof) one or more other characteristics or advantages, or any combination thereof). Some radio technologies (including, for example, future radio technologies) may employ different trade-offs in different scenarios. For example, in some scenarios, a first waveform may be used, and in other scenarios, other waveforms may be selected or used. Such selection or use may take the varying characteristics or advantages into account (e.g., based on which characteristics or advantages may provide improvements to communications in the various scenarios).

The use of one or more mixed waveforms (e.g., multiple waveforms mixed together in the same total bandwidth) may be a technique for wireless communications systems (e.g., sixth generation or 6G systems) to provide a unified framework with flexibility for different trade-offs among conflicting goals that may be present in wireless communications systems. In some examples, OFDMA may be used as a framework for combining such multiple waveforms in communications. Additionally, or alternatively, joint scheduling approaches may be used to coordinate the use of multiple waveforms. Further, approaches for processing (e.g., joint physical layer processing at a transmitter, a receiver, or both) may be used to processes the different waveforms. Further designs or approaches used in wireless communications systems may also consider the use of multiple waveforms (e.g., physical layer designs, MAC designs, other designs, or any combination thereof) may be used to provide flexibility to wireless communications systems in different scenarios that may be associated with different characteristics.

Various techniques for the use of one or more mixed waveforms may be used to transmit data in a wireless communications system. It should be understood that these techniques may be applied to communication of any type of data, including control channel information, information associated with a format of a physical layer packet, channel state information, any information communicated by the UE, a network entity, or other wireless communications device, or any combination thereof.

One example scenario for the use of multiple waveforms may be a satellite system. In a satellite system (e.g., a low earth orbit satellite system, optionally involving a cell phone from factor), a budget for uplink communications may be limited. For example, a presumed satellite service some devices may only provide emergency messaging services. In such cases, there may be a tradeoff between spectral efficiency and PAPR. However, other units (e.g., ground units) may have other form factors. For example, a ground relay network entity may have much larger antenna and power amplifier, and dish units may be able to offer higher data rates. As such, a PAPR metric may be less of an issue for these devices compared to other devices. Yet another example in which multiple waveforms may be used is a scenario involving uplink synchronization among users in a very large cell.

In these and other examples, it may be desirable to accommodate the use of multiple waveforms within a single total bandwidth for a wireless communications system. In some cases, the use of OFDMA may provide a framework within which frequency regions may be carved out for other waveforms, and such approaches may be applied to uplink communications, downlink communications, or both.

In some examples, high frequency wireless communications systems may be used. In such systems, power consumption for transmission may increase with a carrier frequency, but a signal bandwidth may remain the same. As such, power saving and low PAPR may be a consideration for high frequency systems. In some such cases, a tradeoff between PAPR and spectral efficiency may exist (e.g., a higher PAPR may be associated with lower spectral efficiency, and vice-versa). As such, it may be desirable to accommodate the use of multiple waveforms within a single total bandwidth for a wireless communications system. In some cases, the use of OFDMA may provide a framework within which frequency regions may be carved out for other waveforms, and may be applied to uplink communications, downlink communications, or both. For example, OFDMA approaches may define a grid of time and frequency resources and assigns those resources among different device, logical channels, other elements, or any combination thereof. This framework is well-suited to the subject matter described herein, since this same convention or approach may be applied to the assignment of different resources for different waveforms within a total system bandwidth.

To provide for the use of multiple waveforms in a single total bandwidth, various approaches, techniques, schemes, processes, or procedures may be used. For example, different waveforms may be mixed in the time domain (e.g., at any given time, a single waveform type may be used for a particular user). Additionally, or alternatively, FDM among the waveforms may be used. For example, a total bandwidth (e.g., for a device or a wireless communications system) may be divided into regions in which one or more waveforms may be used. The division of regions may coincide with division of BWPs or may be divided differently. For example, the division can be more dynamic or have finer resolution than BWPs (e.g., multiple waveforms can be mixed in a single BWP). Additionally, or alternatively, dynamic scheduling may indicate a type of waveform, its frequency allocation, or both. A scheduling device may consider or analyze tradeoffs between spectral efficiency and link budget or power consumption, and such analysis may provide a basis (e.g., partial or complete) for selecting one or more waveforms. Generally speaking, such waveforms may, in some cases, be classified into two classes: waveforms that rely on time domain processing (e.g., where no Fast Fourier Transform (FFT) or inverse Fast Fourier Transform (IFFT) operations are used to generate or receive the waveform) and waveforms that rely on frequency domain processing (e.g., FFT or IFFT operations are used to generate or receive the waveform). In some examples, some waveforms may be processed with time domain processing, frequency domain processing, or both.

For example, and as depicted in FIG. 2, a UE 115-*a* and an network entity 105-*a* may communicate in a wireless communications system. In some examples, multiple waveforms 220 may be used. For example, the UE 115-*a* may receive (e.g., from the network entity 105-*a*) signaling that may indicate a set of frequency resources that the UE 115-*a* is to use for communications. For example, such a set of frequency resources may correspond to frequency resources 225-*a*, 225-*b*, or 225-*c*. As different waveforms may be better suited for different communications scenarios (e.g., different traffic types, different operating environments, different operating characteristics, different device capabilities, other aspects of communications scenarios, or any combination thereof), the UE 115-*a* may transmit (e.g., to the network entity 105-*a*) an indication of a traffic type (e.g., uplink communications) and a receiving device (e.g., the network entity 105-*a*) may select or determine a waveform type to be used for communication in the resources 225 indicated to the UE 115-*a*. Additionally, or alternatively, the network entity 105-*a* may identify or select a traffic type (e.g., for downlink communications) and may select the waveform type independently of another device. Additionally, or alternatively, a device (e.g., the UE 115-*a*) may transmit an indication of capabilities associated with one or more waveform types and the network entity 105-*a* may base the selection or determination of one or more waveforms on the indication of capabilities.

The network entity 105-*a* may transmit (e.g., to the UE 115-*a*) an indication of the waveform type that the UE 115-*a* is to use for communicating over the indicated resources 225. For example, the network entity 105-*a* may indicate the resources 225-*a* and the waveform 220-*a* to the UE 115-*a*. In some examples, the selected or determined waveform 220 may be indicated to be used for time period, such as time period 230. For example, the network entity 105-*a* may have received or determined information indicating a condition or characteristic of the wireless communications system 200 that may be valid or may last for the time period 230, and therefore the UE 115-*a* may use the waveform 220-*a* for communications over the resources 225-*a* during the time period 230.

As shown in FIG. 2, other waveforms (e.g., waveform 220-*b* and 220-*c*) may be used within the same bandwidth 235 as the waveform 220-*a* that is indicated to the UE 115-*a*. For example, a first additional wireless device (e.g., another UEs) may communicate using the waveform 220-*b* for communicating using the resources 225-*b* and a second additional wireless device (e.g., yet another UE) may communicate using the waveform 220-*c* for communicating using the resources 225-*c*. The additional devices may receive an indication of the same time period 230 to use for communications or may receive an indication of a different time period. In this way, the various waveforms 220 may be multiplexed or combined together for use within the bandwidth 235 of the wireless communications system 200. The UE 115-*a* (and optionally, the additional wireless devices) may communicate using the respectively indicated or selected waveforms 220 and resources 225 all within the bandwidth 235 of the wireless communications system 200.

Figure 3:
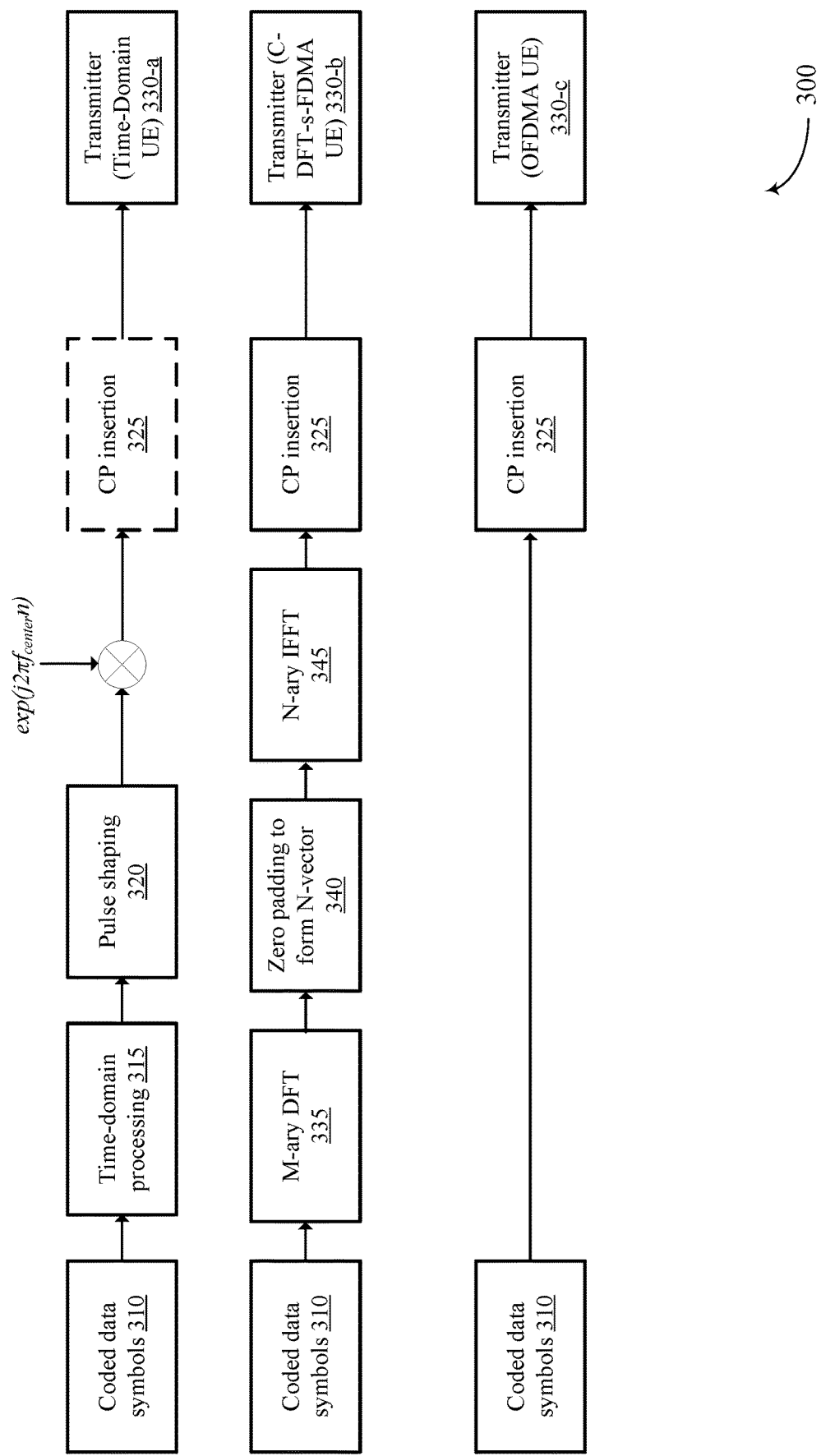
FIG. 3 illustrates an example of a processing scheme that supports mixed waveform communications in accordance with one or more aspects of the present disclosure.

FIG. 3 illustrates an example of a processing scheme 300 that supports mixed waveform communications in accordance with one or more aspects of the present disclosure. The processing scheme 300 may describe one or more examples of processing associated with transmission of one or more waveforms. For example, processing scheme 300 shows an example of a transmitter 330-*a* for a UE using a time domain-based waveform and transmitters 330-*b* and 330-*c* using frequency domain-based waveforms, along with associated processing operations. In the processing scheme 300, the operations depicted may be performed at different times or in different orders. Some operations may be left out or other operations may be added. In addition, the operations depicted may also be performed in associated with other elements of the processing scheme, even though such associations or operations may not be shown in the example depicted in FIG. 3.

In FIG. 3, the various transmitters 330 may each be associated with a UE or other device that may transmit the waveform for which the processing is performed. In some examples, such UEs may execute processing for the waveform type that was indicated to the UE and not for other waveform types. Further, the various types of waveforms used by the various UEs may be multiplexed in a frequency domain within a bandwidth of a wireless communications system.

As described herein, various waveform types may be used. Generally speaking, the waveform types may be divided into various groups of waveform types, including time domain processing-based waveforms and frequency domain processing-based waveforms. Further, some waveform types may be processed or generated using multiple techniques (e.g., time-domain processing, frequency-domain processing, or both). For example, some waveforms may be categorized (e.g., depending on one or more associated processes or procedures) as both time domain-processing waveforms and frequency domain-processing waveforms. Additionally, or alternatively, different waveforms within the categories of time domain-processing waveforms and frequency domain-processing waveforms may be processed in different ways.

For example, time domain processing-based waveforms may include a direct sequence waveform in which coded data symbols 310 may be multiplied with spreading codes (e.g., similar to approaches used in a CDMA system), which may be an example of time-domain processing 315. Such direct sequence waveforms may offer an decreased or lower PAPR as compared to other waveforms (such as OFDMA waveform), as multiple data symbols are not mixed in the final waveform (e.g., although the use of a pulse shaping 320, such as a pulse shaping filter may mix the multiple data symbols to some extent). The transmitted signal of a direct sequence waveform may occupy a contiguous trunk or set of frequency resources within a total bandwidth of a system. Additionally, or alternatively, frequency hopping may be used to provide additional frequency diversity. Further, synchronization and orthogonality parameters may be modified, increased, decreased, or relaxed, and autonomous transmissions of direct sequence waveforms may also be used. Optionally, processing may include a cyclic prefix (CP) insertion 325.

Time domain processing-based waveforms may further include a resource spread multiple access (RSMA) waveform in which multiple signals from multiple devices may be super-positioned on top of each other and one or more of the multiple signals may be spread to some or all of the resources (e.g., frequency resources, time resources, spatial resources, or any combination thereof) associated with or assigned to the multiple devices. For example, in an up-sampling or DFT repetition approach, M data symbols may be up-sampled by a factor of K to form a N=M*K-long time domain sequence with the M symbols being distributed therein. A PAPR of such a waveform may be comparable with that of a direct stream waveform (e.g., an decreased or lower PAPR as compared to other waveforms (such as OFDMA waveform)). In some examples, RSMA approaches may include smoothing across the up-sampled data samples, which may reduce PAPR. In some examples, in order to fully utilize a set of frequencies, multiple devices may be scheduled together. Optionally, processing may include a CP insertion 325.

Time domain processing-based waveforms may further include sequence repetition waveforms (e.g., an up-sampled DFT waveform or a distributed DFT spread FDMA (DFT-s-FDMA)). In such waveforms, an M-ary DFT 335 may be applied to M coded data symbols 310. The M DFT values may be evenly distributed (e.g., up-sampled in frequency, such as by a factor of K=N/K) to form an N-ary vector to which IFFT is applied (e.g., the N-ary IFFT 345). In some examples, the PAPR of such a waveform may be comparable to that of a direct sequence waveform (e.g., an decreased or lower PAPR as compared to other waveforms (such as OFDMA waveform)). In some examples, the transmitted signal may be designed to span a larger bandwidth for better frequency diversity. In some examples, in order to fully utilize a set of frequencies, multiple devices may be scheduled together. Optionally, processing may include a CP insertion 325.

Time domain processing-based waveforms may further include constant envelope waveforms. Such waveforms may include gaussian minimum shift keying waveforms (e.g., those used in Global System for Mobile Communications (GSM) and Bluetooth low energy applications, specifications, or approaches). Such waveforms may further include minimum-shift keying waveforms (e.g., as used in some personal area networks), as well as minimum-shift keying approaches involving non-linear modulations. These and other constant envelope waveforms may be associated with a reduced PAPR, a reduced spectral efficiency, or both. Optionally, processing may include a CP insertion 325.

Frequency domain processing-based waveforms may further include contiguous DFT-s-FDMA waveforms in which an M-ary DFT 335 may be applied to coded data symbols 310. The M DFT values may be placed contiguously to form a N-ary vector to which IFFT is applied (e.g., the N-ary IFFT 345). Such waveforms may be associated with a lower PAPR than other waveforms (such as OFDMA waveform), though it may be higher than that of a direct stream waveform. In some examples, an improved spectral efficiency may be obtained through frequency-domain equalization at a receiver. Optionally, processing may include a CP insertion 325, zero padding to form N-vector 340, or both.

Frequency domain processing-based waveforms may further include OFDMA waveforms in which coded data symbols 310 may be placed in the frequency domain. For example, the transmitter 330-c may transmit OFDMA waveforms generated through the use of the coded data symbols 310, a CP insertion 325, or any combination thereof. Frequency domain processing-based waveforms may further include frequency-modulated continuous wave waveforms that may be used for sensing. Such waveforms may be a modification of or included within the designation of OFDMA waveforms by allocating frequency resources as a frequency ramp. Further modifications or variations of OFDMA may also be used, including various pre-coding variations that may be introduced across sub-carriers. Optionally, processing may include a CP insertion 325, zero padding to form N-vector 340, or both.

Frequency domain processing-based waveforms may further include a frequency domain processing-based version of RSMA that may be implemented by performing an M-ary DFT 335 and repeating it K times in a frequency domain. Optionally, processing may include a CP insertion 325.

In some examples, joint scheduling approaches or techniques may be utilized to aid in scheduling the multiple waveforms for communication within a total bandwidth of a wireless communications system. Nominally, if the total bandwidth is occupied by pure OFDMA waveforms, N sub-carriers may be used (e.g., N-ary FFT, IFFT, or both may be used). Some such approaches may assume or employ an ODFMA chip duration $T_C$ and an ODFMA symbol duration of $N*T_C$.

In examples of both time domain processing-based waveforms and frequency domain processing-based waveforms, insertion of a CP (e.g., CP insertion 325) may enable FFT with an entire bandwidth at a receiver. In some examples, including a CP may involve additional overhead, increased symbol level synchronization with other frequency domain waveforms, or both. However, insertion of a CP may provide the benefit of a frequency domain equalizer at receiver. In cases that employ CP insertion 325, autonomous transmissions are still possible but may be more subject to symbol timing parameters. In cases that do not employ CP insertion 325, the transmission time may be more flexible. Further, without CP insertion 325, a receiving device may employ additional resources to search for the time domain signal and equalization may be more complex for higher data rates.

If multiple waveforms are mixed in frequency domain, the entire bandwidth may be divided into regions wherein each region is mapped to one waveform. One or more frequency regions may be defined as component carriers, BWPs, other regions (e.g., a set of frequency resources signaled through control signaling such as RRC configurations which are semi-static or dynamically scheduled through other control signaling such as MAC layer messages or PHY layer control channel messages), or any combination thereof. In some examples, scheduling approaches may allow for different waveforms to be used for uplink and downlink communications. For example, a direct stream waveform may be used for uplink communications and OFDMA may be used for downlink communications. Different combinations or approaches may be better suited for different applications, traffic types, or other variables or characteristics (e.g., satellite communication may employ a direct stream waveform for uplink communications and an OFDMA waveform for downlink communications).

In some examples (e.g., as depicted in FIG. 3), one or more waveforms associated with time domain processing may be multiplied by a center frequency $f_{center}$, optionally with guard sub-carriers on one or both sides of the allocated frequency region.

As described herein frequency resources may be allocated for different waveforms, and various factors may influence frequency resource allocation. One such factor may include PAPR, which may influence or be a factor upon which frequency resource allocation for uplink, downlink, or both, may be based. In some examples, OFDMA may offer increased spectral efficiency and improved MIMO schemes. UEs or other devices associated with PAPR limitations may be placed into regions according to one or more preferences or orders. For example, one such preference may employ the following preference order of waveforms: direct stream/upsampling (DFT Repetition)/sequence repetition (distributed DFT-s-FDMA), contiguous DFT-s-FDMA, and OFDMA. In some examples, the direct stream waveform may include one or more advantages, including that of relaxed synchronization and orthogonality parameters. As such, a direct stream waveform may be suitable for low latency low data rate traffic (e.g., control information, voice, other low latency traffic, or any combination thereof).

In some wireless communications systems, the approaches described herein may be used in MIMO scenarios. A first MIMO approach may involve using sub-band MIMO with OFDMA. Such approaches may be particularly applicable to channel with high MIMO ranks, wide bandwidths (e.g., (such that frequency selectivity in MIMO codewords is non-negligible), or both. Additionally, or alternatively, MIMO approaches may employ continuous DFT-s-FDMA, which may be used in uplink MIMO situations. Additionally, or alternatively, MIMO approaches may employ the use of time-domain waveforms. Such approaches may be particularly beneficial when a channel is not selective over the bandwidth used by the waveform. MIMO in Universal Mobile Telecommunications System (UMTS) scenarios may be an example use case. Additionally, or alternatively, MIMO approaches may be used in higher frequency systems (e.g., as those in sub-THz ranges). In such approaches, lenses could be used to achieve MIMO in line-of-sight channels. Further, the channel used may be less frequency selective so that MIMO can be achieved for the time and frequency domain waveforms.

As described herein, the approaches for using multiple waveforms may be applied to both uplink and downlink operations. In some downlink operations, the waveforms used may be OFDMA waveforms that may not utilize mixing or multiplexing of multiple waveforms in a total bandwidth of a system. However, downlink operations are not precluded from using multiple waveforms and such systems may use the approaches described herein (e.g., to improve PAPR metrics in a system). In some downlink scenarios, a transmitting device may use one waveform at a time and a receiving device may process the one waveform and, optionally, may not perform processing associated with other waveforms. However, multiple downlink transmitting devices may use differing waveforms that may be multiplexed within frequency resources, similar to the approaches described herein for uplink transmitting devices.

Figure 4:
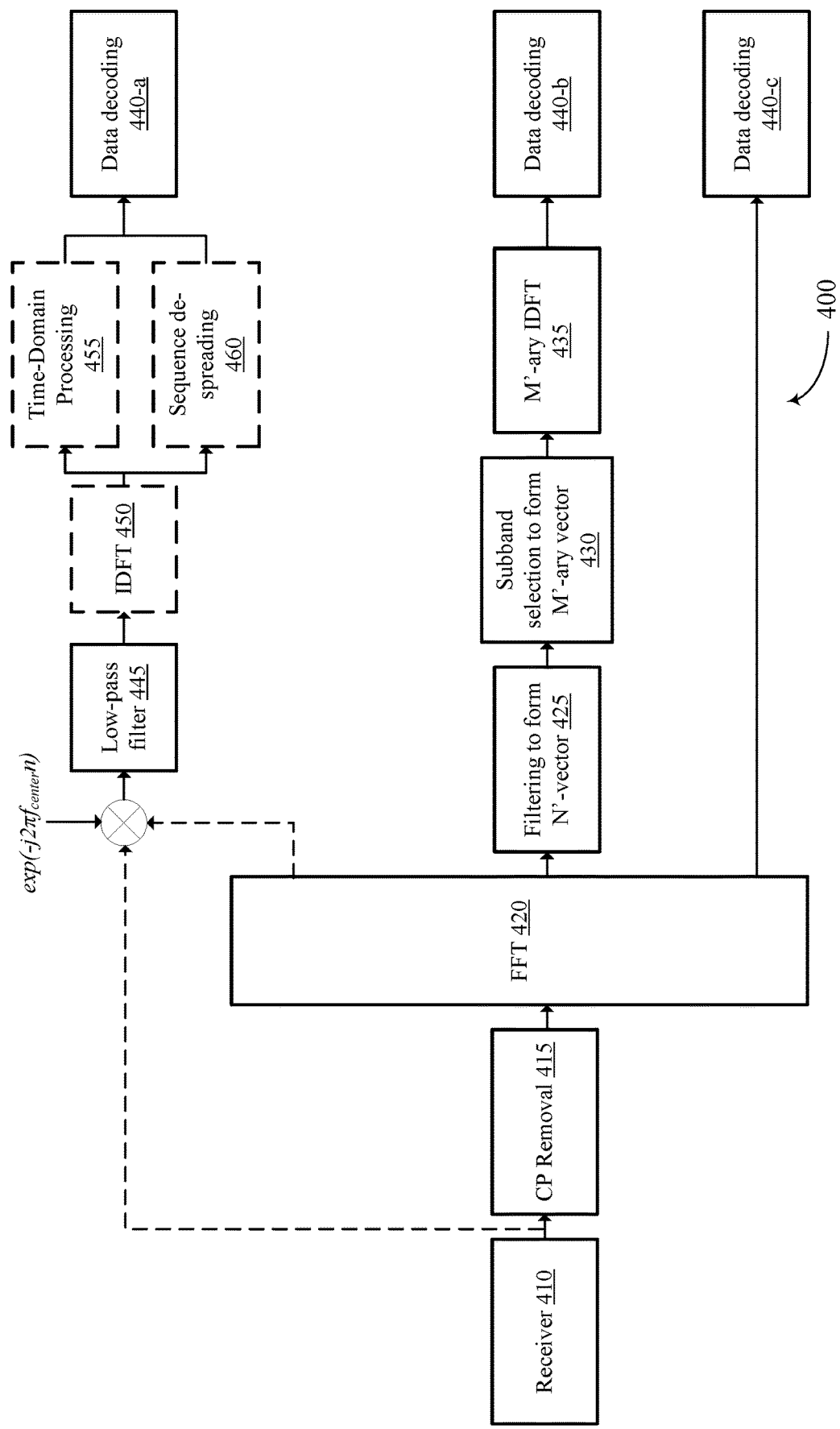
FIG. 4 illustrates an example of a processing scheme that supports mixed waveform communications in accordance with one or more aspects of the present disclosure.

FIG. 4 illustrates an example of a processing scheme 400 that supports mixed waveform communications in accordance with one or more aspects of the present disclosure. The processing scheme 400 describes different options for processing that may be performed at a receiving device in a wireless communications system that utilizes the approaches described herein relating to multiple waveforms being used within a total bandwidth of a wireless communications system. As different waveforms may have different characteristics and various methods of processing may have been used to generate and transmit the waveform, various method of processing may be applied at the receiving device to properly interpret and process the transmission to obtain the information in the transmission. Such processing steps may vary between situations, implementations, waveform types, or other scenarios as described herein. In the processing scheme 400, the operations depicted may be performed at different times or in different orders. Some operations may be left out or other operations may be added. In addition, the operations depicted may also be performed in associated with other elements of the processing scheme, even though such associations or operations may not be shown in the example depicted in FIG. 4.

The upper branch depicted in FIG. 4 (ultimately resulting in data decoding 440-a) may be associated with the processing of time domain processing-based waveforms and may be associated with the transmission processing associated with transmitter 330-a described in relation to FIG. 3. In such scenarios, the receiver 410 may receive the transmission and may optionally perform a CP removal 415 to remove a cyclic prefix from the transmission to facilitate further processing. In some examples, the CP removal 415 may not be performed, and the signal may then be processed to reverse the application of a center frequency to the signal. Additionally, or alternatively, the CP removal 415 may be performed and a FFT 420 operation may be performed, after which the reversal of the application of the center frequency may be performed. A low-pass filter 445 may be applied to the signal and an IDFT 450 procedure or processing may be performed on the signal, after which time-domain processing 455, sequence de-spreading 460, or both may be performed. For example, different waveforms may utilize time-domain processing 455, whereas other waveforms (e.g., RSMA waveforms) may utilize sequence de-spreading 460. In some examples, data decoding 440-a may then be performed.

The middle branch in FIG. 4 (ultimately resulting in data decoding 440-b) may be associated with the processing of frequency domain processing-based waveforms and may be associated with the transmission processing associated with transmitter 330-b as described in relation to FIG. 3. In such scenarios, the receiver 410 may receive the transmission and a CP removal 415 may be performed to remove a cyclic prefix from the transmission to facilitate further processing. The FFT 420 processing may be applied, after which filtering to form N'-vector 425 may be performed. The subband selection to form M'-ary vector 430 may be performed, after which an M'-ary IDFT 435 may be performed. The "prime" notation of "M'-ary" or "N'-ary" (as opposed to "M-ary" or "N-ary") is used herein and in the drawings to indicate the receiving side reconstruction of the original signals, vectors, or other elements. The data decoding 440-b may then be performed to obtain information or data of the transmission.

The lower branch in FIG. 4 (ultimately resulting in data decoding 440-c) may be associated with the processing of frequency domain processing-based waveforms and may be associated with the transmission processing associated with transmitter 330-c as described in relation to FIG. 3. In such scenarios, the receiver 410 may receive the transmission and a CP removal 415 may be performed to remove a cyclic prefix from the transmission to facilitate further processing.

The FFT 420 processing may be applied, after which data decoding 440-*b* may then be performed to obtain information or data of the transmission.

In some cases, the FFT 420 processing may be taken for a portion of the bandwidth (e.g., with time domain processing for some waveforms). Further, in some examples, time domain processing-based waveforms may occupy or use frequency resources that may be at an edge of the total bandwidth of a device or a wireless communications system. Additionally, or alternatively, the FFT 420 processing may be taken for an entire bandwidth of a device or wireless communications system in cases in which multiple types of waveforms are multiplexed in frequency resources. In some such cases, a CP may be added to the time domain waveform transmissions. Further, a receiving device (e.g., a network entity) may execute processing for a waveform used in the transmission to be received and may not execute processing for other types of waveforms that are not to be used for the transmission and reception.

Figure 5:
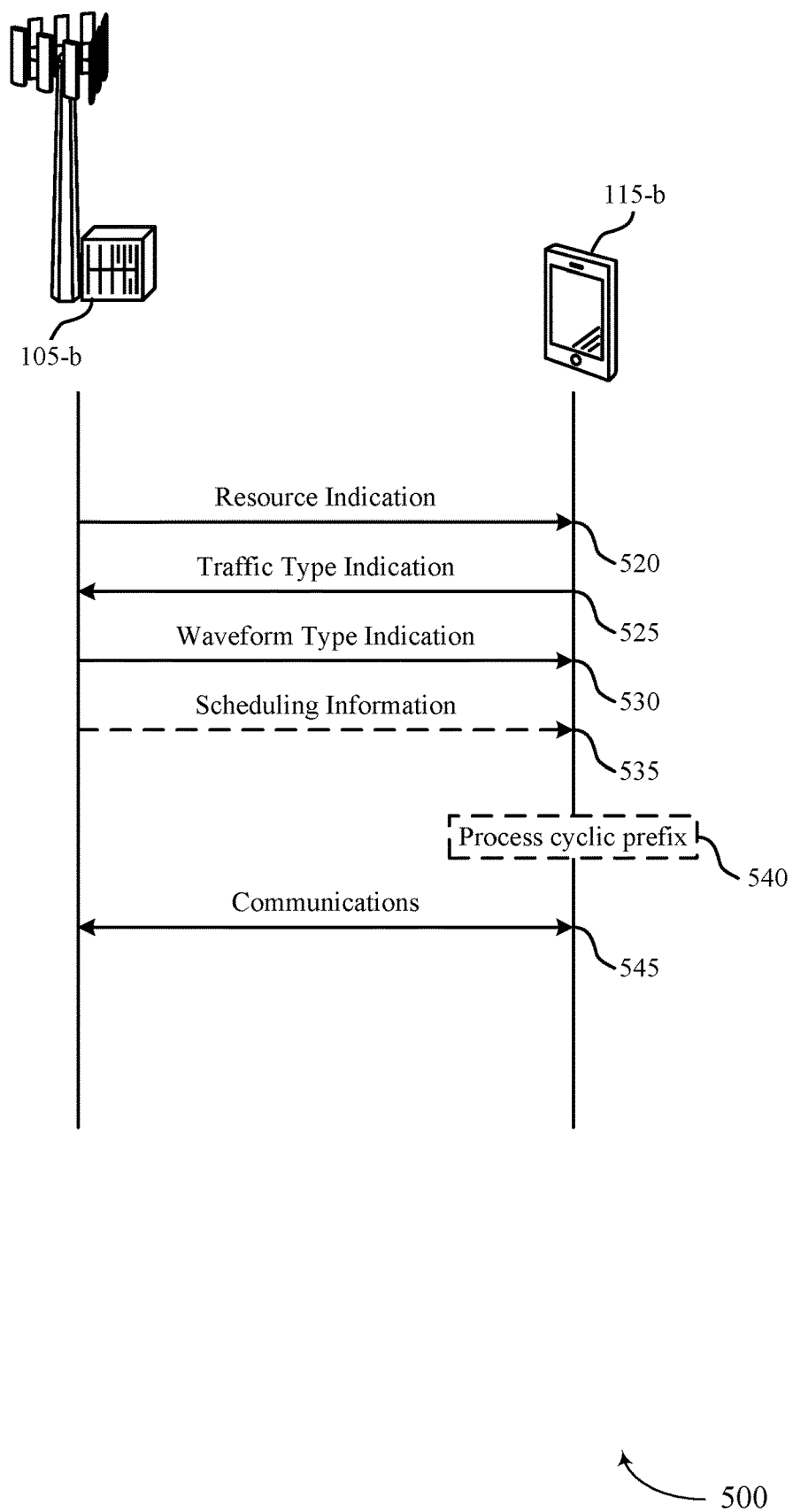
FIG. 5 illustrates an example of a process flow that supports mixed waveform communications in accordance with one or more aspects of the present disclosure.

FIG. 5 illustrates an example of a process flow 500 that supports mixed waveform communications in accordance with one or more aspects of the present disclosure. The process flow 500 may implement various aspects of the present disclosure described herein. The elements described in the process flow 500 (e.g., network entity 105-*b* and UE 115-*b*) may be examples of similarly-named elements described herein.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the UE 115-*b* may receive an indication of a set of frequency domain resources allocated to the UE for communicating data over a wireless channel. In some examples, the set of frequency domain resources occupy an entirety of a bandwidth part. In some examples, the set of frequency domain resources occupy a portion of a bandwidth part.

At 525, for uplink traffic, the UE 115-*b* may transmit an indication of a traffic type associated with communicating over the wireless channel. At 525, for downlink traffic, the network is aware of the traffic type.

At 530, the UE 115-*b* may receive an indication of a waveform type associated with the set of frequency domain resources, wherein the waveform type is based on a data type of the data, is to be used for a defined amount of time, and is one of a plurality of waveform types that are multiplexed together over different frequency domain resources within a total system bandwidth. In some examples, receiving the indication of the waveform type may be based on a peak to average power ratio metric associated with the UE.

In some examples, the plurality of waveform types that are multiplexed together over different frequency domain resources within the total system bandwidth may include a combination of one or more frequency domain processing-based waveforms and one or more time domain processing-based waveforms. In some examples, the one or more time domain processing-based waveforms comprise one or more of a direct sequence waveform, a resource spread multiple access waveform, an up-sampling waveform, a distributed Fourier spread waveform, a constant envelope waveform, or any combination thereof. In some examples, the one or more time domain processing-based waveforms occupy frequency domain resources located at an edge of the total system bandwidth.

In some examples, the waveform type may be a direct sequence waveform type and the set of frequency domain resources may include multiple contiguous subbands of the total system bandwidth. In some examples, the waveform type may include one or more of a distributed Fourier spread waveform type or an up-sampling waveform type. In some examples, the one or more frequency domain processing-based waveforms comprise one or more of a contiguous Fourier spread waveform, an orthogonal frequency domain multiple access waveform, a frequency modulated continuous wave waveform, or any combination thereof.

At 535, the UE 115-*b* may receive scheduling information associated with the direct sequence waveform type comprising a center frequency, a chip rate, a spreading factor, a data rate, or any combination thereof.

At 540, the UE 115-*b* may process a cyclic prefix associated with the direct sequence waveform type.

At 545, the UE 115-*b* may communicate within the set of frequency domain resources according to the indicated waveform type and the data type. In some examples, the UE 115-*b* may communicate within the set of frequency domain resources according to the direct sequence waveform type and the scheduling information.

Note that the communication in FIG. 5 may happen on either downlink or uplink.

Figure 6:
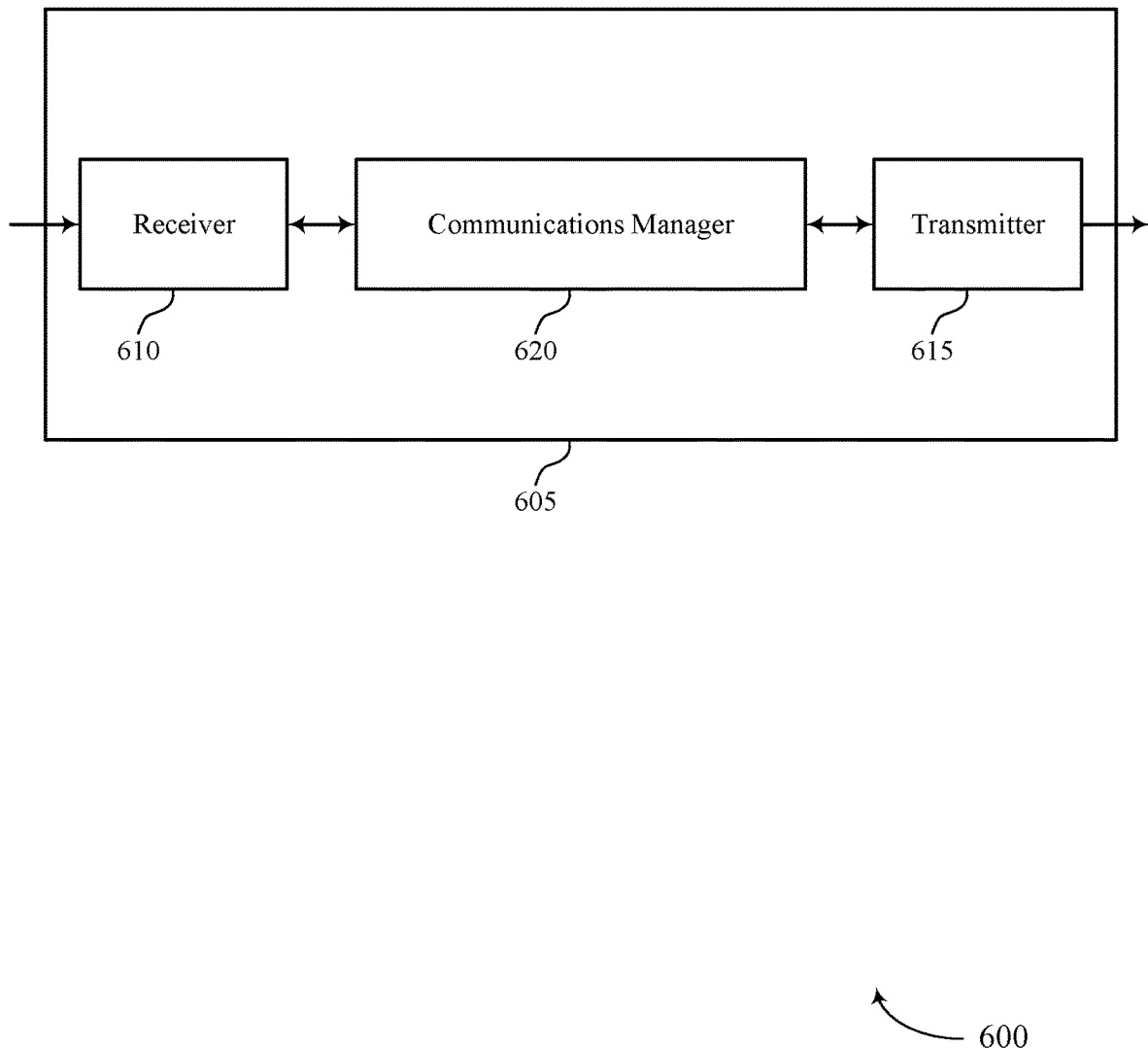
FIGS. 6 and 7 show block diagrams of devices that support mixed waveform communications in accordance with one or more aspects of the present disclosure.

FIG. 6 shows a block diagram 600 of a device 605 that supports mixed waveform communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to mixed waveform communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to mixed waveform communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of mixed waveform communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

Additionally, or alternatively, the communications manager 620 may support wireless communication at a UE in accordance with examples as disclosed herein. For example, the communications manager 620 may be configured as or otherwise support a means for receiving an indication of a set of frequency domain resources allocated to the UE for communicating data over a wireless channel. The communications manager 620 may be configured as or otherwise support a means for transmitting an indication of a traffic type associated with communicating over the wireless channel. The communications manager 620 may be configured as or otherwise support a means for receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The communications manager 620 may be configured as or otherwise support a means for communicating within the set of frequency domain resources according to the indicated waveform type and the data type.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, more efficient utilization of communication resources, or any combination thereof.

Figure 7:
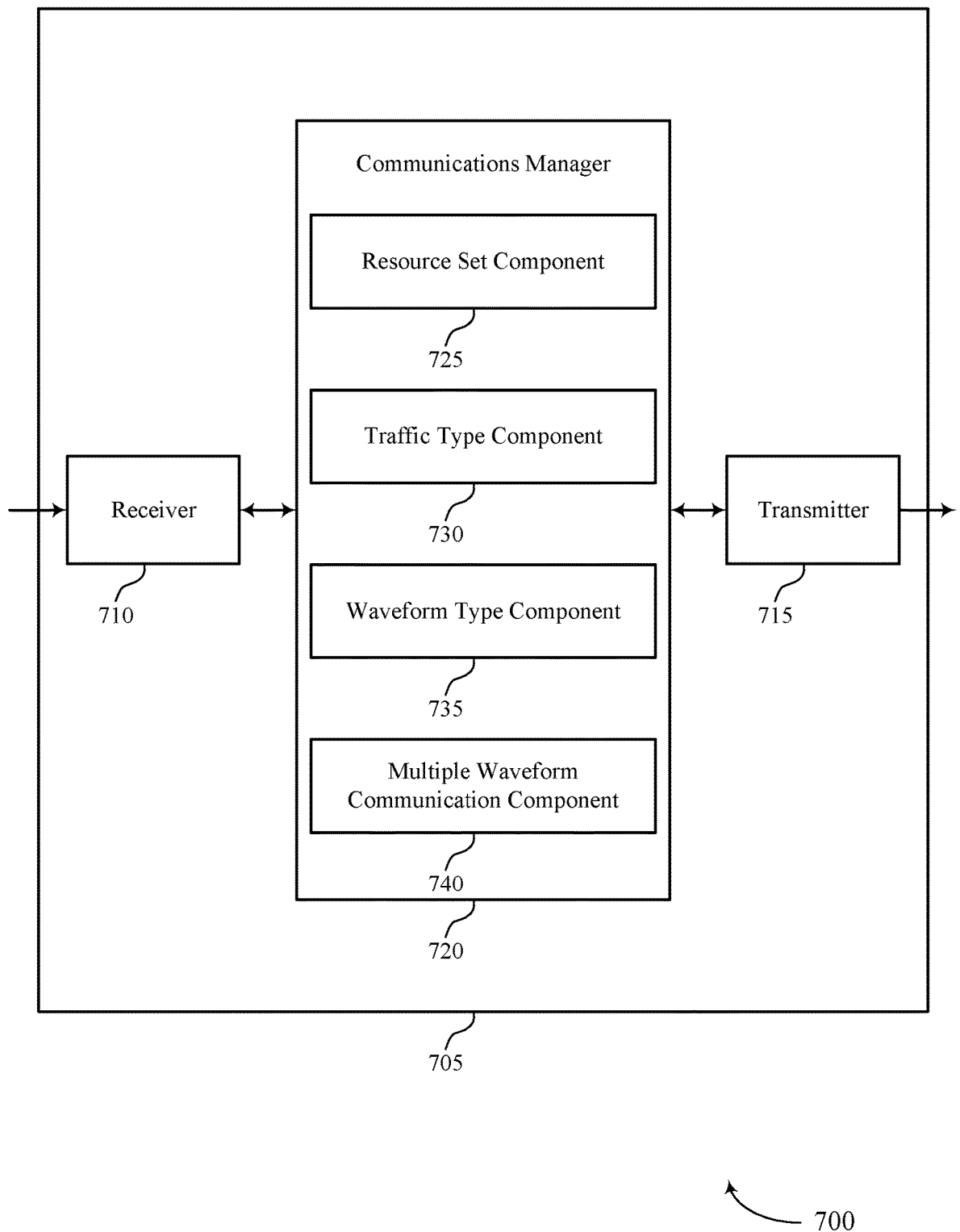

FIG. 7 shows a block diagram 700 of a device 705 that supports mixed waveform communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to mixed waveform communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to mixed waveform communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of mixed waveform communications as described herein. For example, the communications manager 720 may include a resource set component 725, a traffic type component 730, a waveform type component 735, a multiple waveform communication component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The resource set component 725 may be configured as or otherwise support a means for receiving an indication of a set of frequency domain resources allocated to the UE for communicating data over a wireless channel. The traffic type component 730 may be configured as or otherwise support a means for transmitting an indication of a traffic type associated with communicating over the wireless channel. The waveform type component 735 may be configured as or otherwise support a means for receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The multiple waveform communication component 740 may be configured as or otherwise support a means for communicating within the set of frequency domain resources according to the indicated waveform type and the data type.

Figure 8:
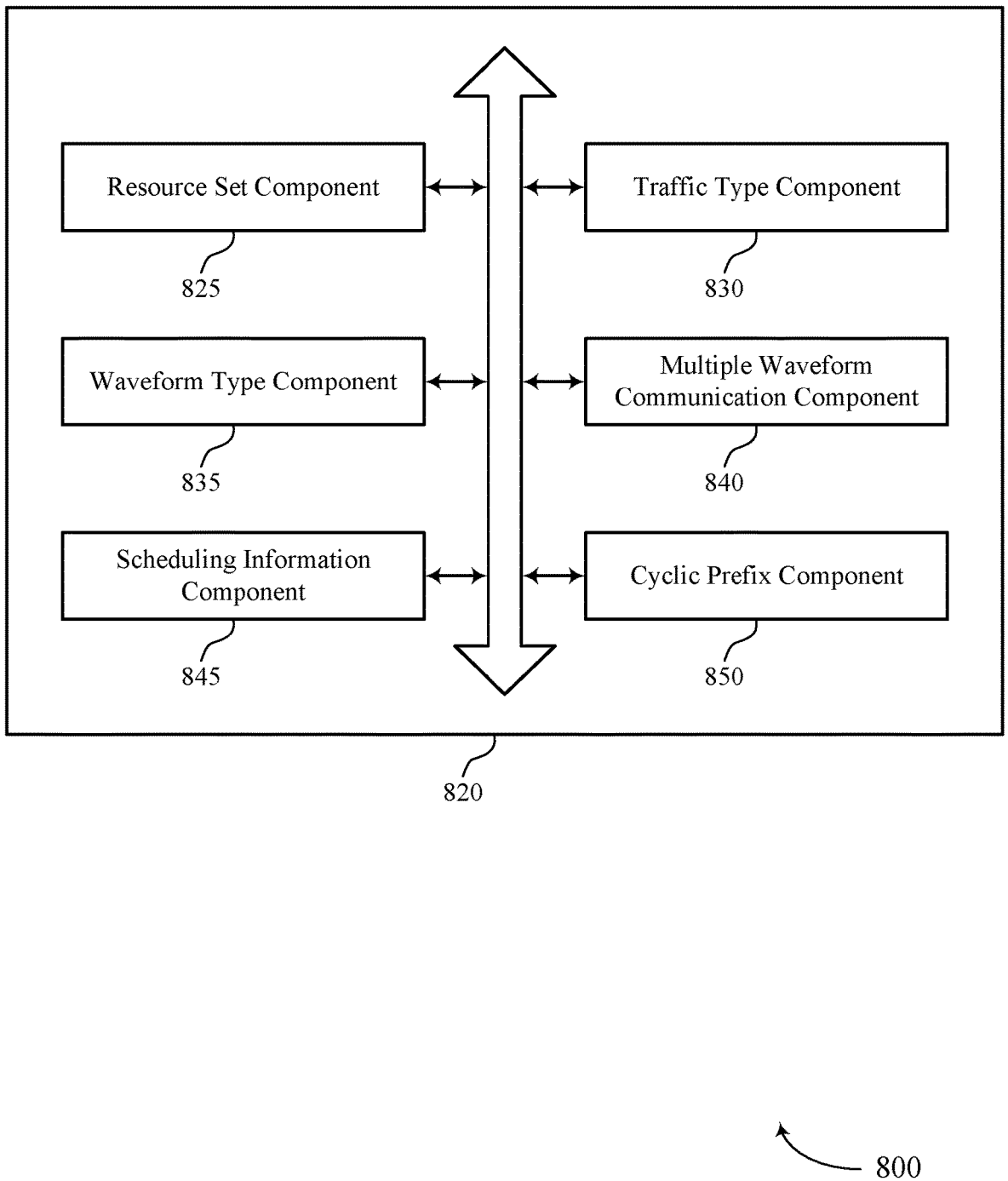
FIG. 8 shows a block diagram of a communications manager that supports mixed waveform communications in accordance with one or more aspects of the present disclosure.

FIG. 8 shows a block diagram 800 of a communications manager 820 that supports mixed waveform communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of mixed waveform communications as described herein. For example, the communications manager 820 may include a resource set component 825, a traffic type component 830, a waveform type component 835, a multiple waveform communication component 840, a scheduling information component 845, a cyclic prefix component 850, or any combination thereof. Each of these components may communicate, directly or indirectly, with one another (e.g., via one or more buses).

Additionally, or alternatively, the communications manager 820 may support wireless communication at a UE in accordance with examples as disclosed herein. The resource set component 825 may be configured as or otherwise support a means for receiving an indication of a set of frequency domain resources allocated to the UE for communicating data over a wireless channel. The traffic type component 830 may be configured as or otherwise support a means for transmitting an indication of a traffic type associated with communicating over the wireless channel. The waveform type component 835 may be configured as or otherwise support a means for receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The multiple waveform communication component 840 may be configured as or otherwise support a means for communicating within the set of frequency domain resources according to the indicated waveform type and the data type.

In some examples, to support wireless communication at a UE in accordance with examples as disclosed herein, the scheduling information component 845 may be configured as or otherwise support a means for receiving scheduling information associated with the direct sequence waveform type including a center frequency, a chip rate, a spreading factor, a data rate, or any combination thereof. In some examples, to support wireless communication at a UE in accordance with examples as disclosed herein, the multiple waveform communication component 840 may be configured as or otherwise support a means for communicating within the set of frequency domain resources according to the direct sequence waveform type and the scheduling information.

In some examples, the cyclic prefix component 850 may be configured as or otherwise support a means for processing a cyclic prefix associated with the direct sequence waveform type.

In some examples, the waveform type includes one or more of a distributed Fourier spread waveform type or an up-sampling waveform type.

In some examples, the waveform type component 835 may be configured as or otherwise support a means for receiving the indication of the waveform type is based on a peak to average power ratio metric associated with the UE.

In some examples, the set of multiple waveform types that are multiplexed together over different frequency domain resources within the total system bandwidth includes a combination of one or more frequency domain processing-based waveforms and one or more time domain processing-based waveforms.

In some examples, a contiguous Fourier spread waveform, an orthogonal frequency domain multiple access waveform, a frequency modulated continuous wave waveform, or any combination thereof.

In some examples, a direct sequence waveform, a resource spread multiple access waveform, an up-sampling waveform, a distributed Fourier spread waveform, a constant envelope waveform, or any combination thereof.

In some examples, the one or more time domain processing-based waveforms occupy frequency domain resources located at an edge of the total system bandwidth.

In some examples, the set of frequency domain resources occupy an entirety of a bandwidth part.

In some examples, the set of frequency domain resources occupy a portion of a bandwidth part.

Figure 9:
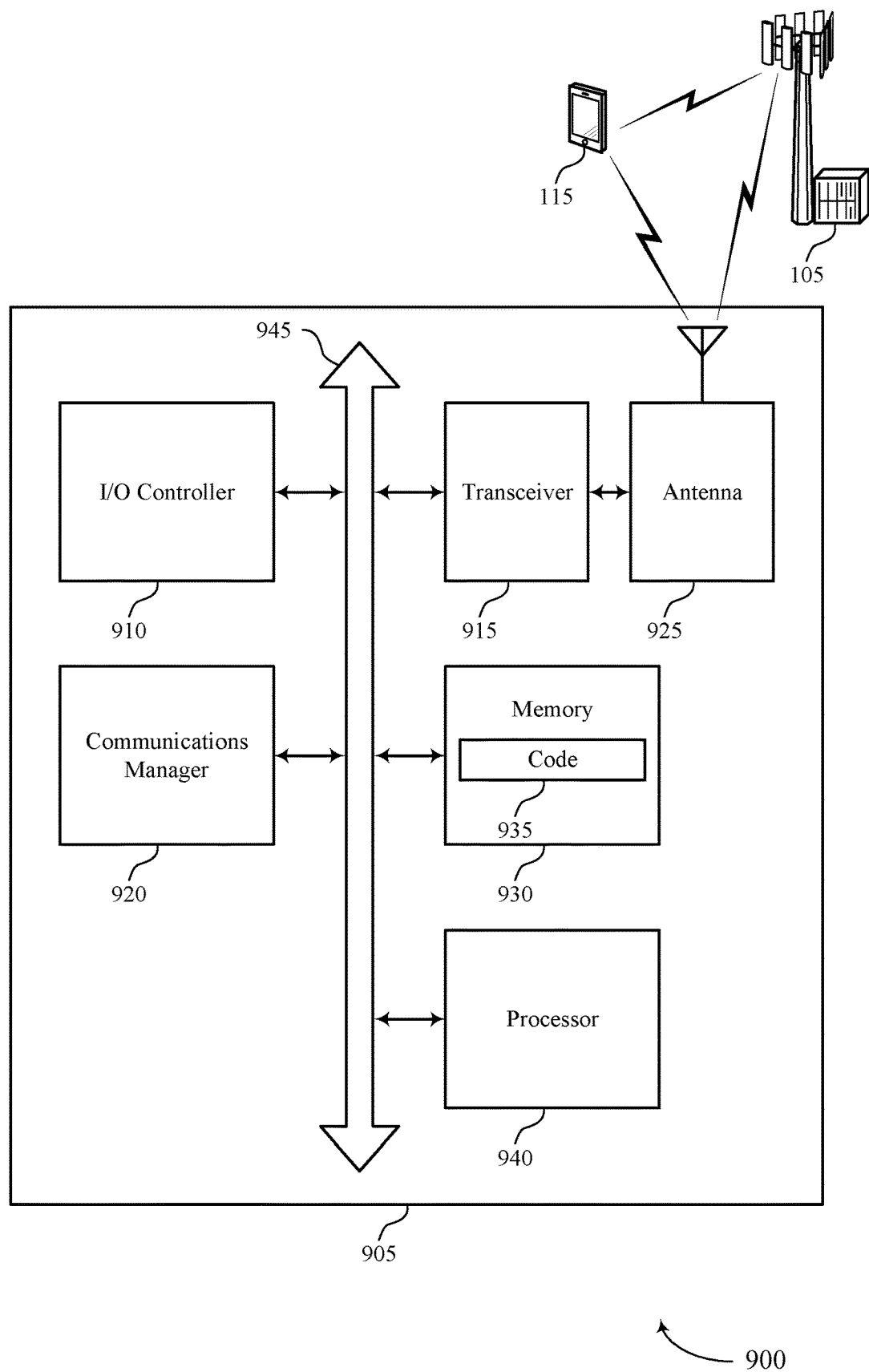
FIG. 9 shows a diagram of a system including a device that supports mixed waveform communications in accordance with one or more aspects of the present disclosure.

FIG. 9 shows a diagram of a system 900 including a device 905 that supports mixed waveform communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting mixed waveform communications). For example, the device 905 or a component of the device 905 may include a processor 940 and memory 930 coupled with or to the processor 940, the processor 940 and memory 930 configured to perform various functions described herein.

Additionally, or alternatively, the communications manager 920 may support wireless communication at a UE in accordance with examples as disclosed herein. For example, the communications manager 920 may be configured as or otherwise support a means for receiving an indication of a set of frequency domain resources allocated to the UE for communicating data over a wireless channel. The communications manager 920 may be configured as or otherwise support a means for transmitting an indication of a traffic type associated with communicating over the wireless channel. The communications manager 920 may be configured as or otherwise support a means for receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The communications manager 920 may be configured as or otherwise support a means for communicating within the set of frequency domain resources according to the indicated waveform type and the data type.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of mixed waveform communications as described herein, or the processor 940 and the memory 930 may be otherwise configured to perform or support such operations.

Figure 10:
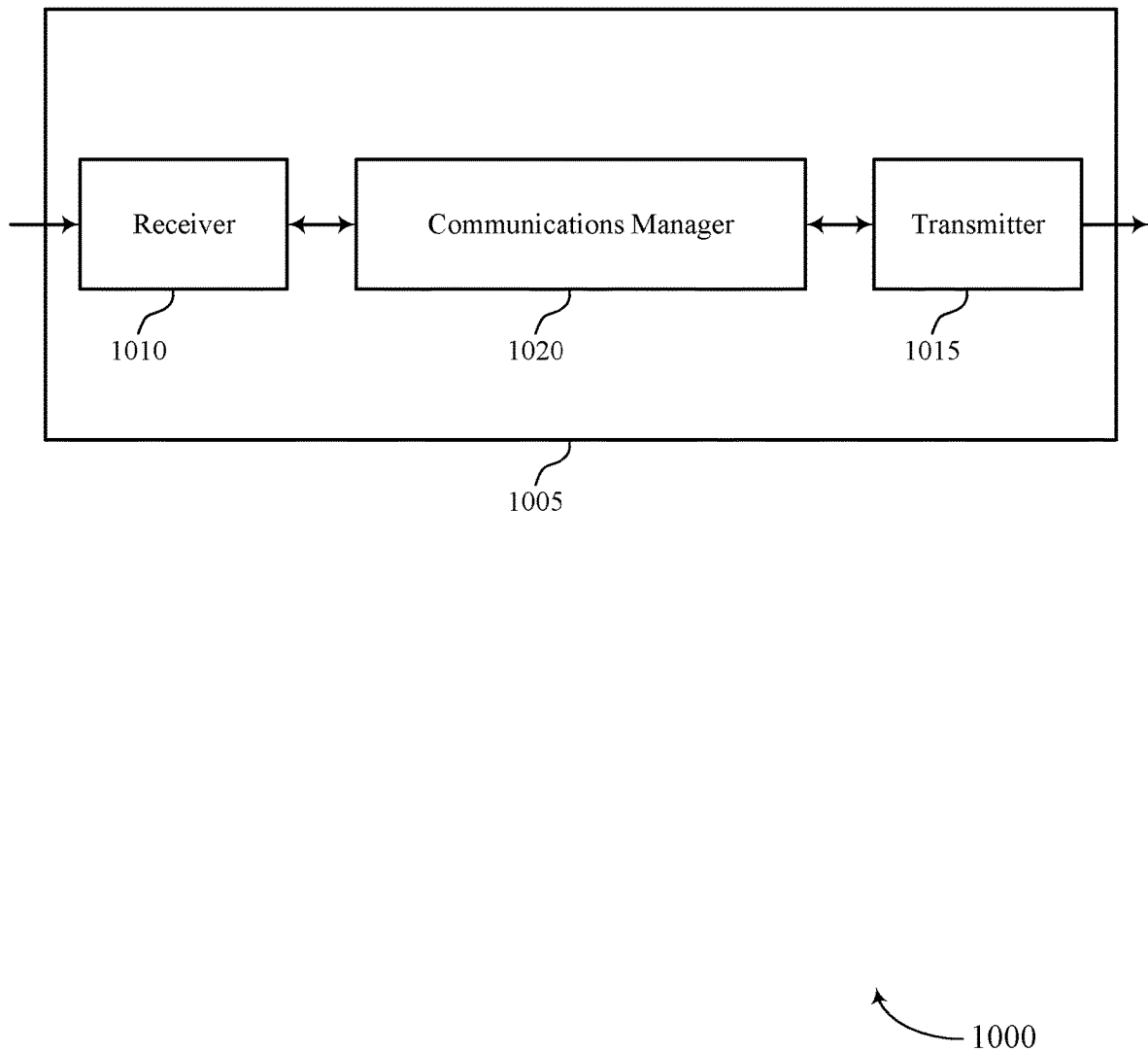
FIGS. 10 and 11 show block diagrams of devices that support mixed waveform communications in accordance with one or more aspects of the present disclosure.

FIG. 10 shows a block diagram 1000 of a device 1005 that supports mixed waveform communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of mixed waveform communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

Additionally, or alternatively, the communications manager 1020 may support wireless communication at a network entity in accordance with examples as disclosed herein. For example, the communications manager 1020 may be configured as or otherwise support a means for transmitting an indication of a set of frequency domain resources allocated to a UE for communicating over a wireless channel. The communications manager 1020 may be configured as or otherwise support a means for receiving an indication of a traffic type associated with communicating over the wireless channel. The communications manager 1020 may be configured as or otherwise support a means for transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The communications manager 1020 may be configured as or otherwise support a means for communicating within the set of frequency domain resources according to the indicated waveform type and the data type.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, more efficient utilization of communication resources, or any combination thereof.

Figure 11:
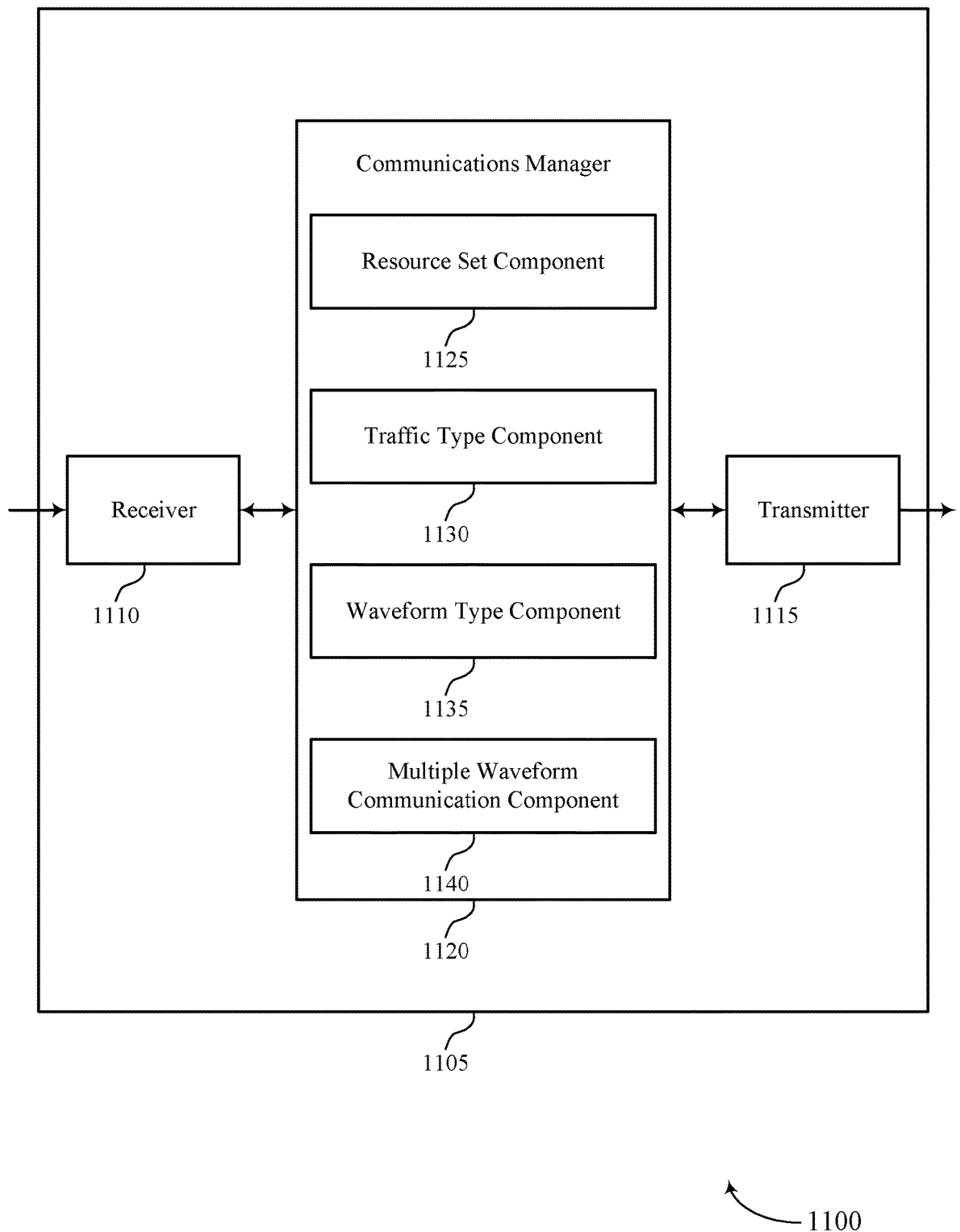

FIG. 11 shows a block diagram 1100 of a device 1105 that supports mixed waveform communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of mixed waveform communications as described herein. For example, the communications manager 1120 may include a resource set component 1125, a traffic type component 1130, a waveform type component 1135, a multiple waveform communication component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The resource set component 1125 may be configured as or otherwise support a means for transmitting an indication of a set of frequency domain resources allocated to a UE for communicating over a wireless channel. The traffic type component 1130 may be configured as or otherwise support a means for receiving an indication of a traffic type associated with communicating over the wireless channel. The waveform type component 1135 may be configured as or otherwise support a means for transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The multiple waveform communication component 1140 may be configured as or otherwise support a means for communicating within the set of frequency domain resources according to the indicated waveform type and the data type.

Figure 12:
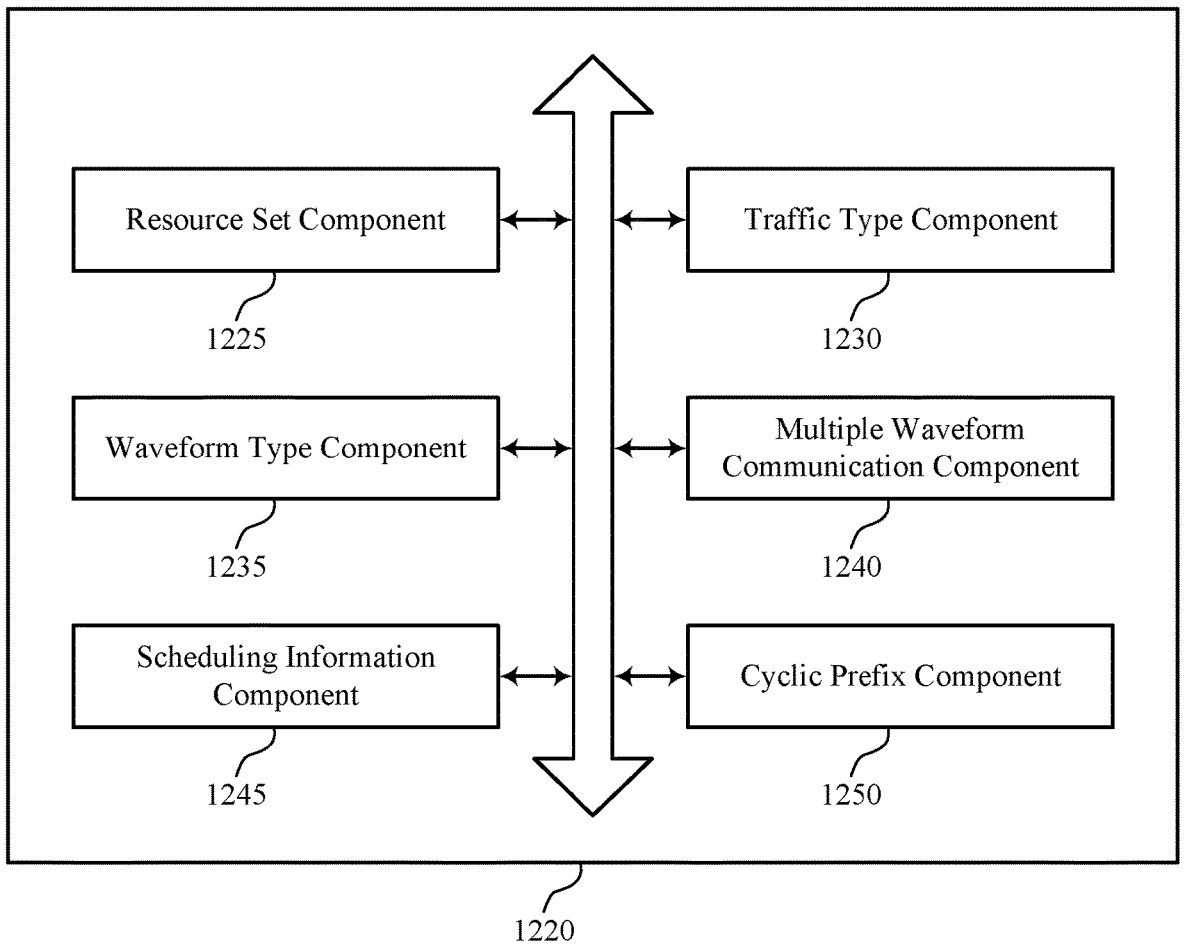
FIG. 12 shows a block diagram of a communications manager that supports mixed waveform communications in accordance with one or more aspects of the present disclosure.

FIG. 12 shows a block diagram 1200 of a communications manager 1220 that supports mixed waveform communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of mixed waveform communications as described herein. For example, the communications manager 1220 may include a resource set component 1225, a traffic type component 1230, a waveform type component 1235, a multiple waveform communication component 1240, a scheduling information component 1245, a cyclic prefix component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1220 may support wireless communication at a network entity in accordance with examples as disclosed herein. The resource set component 1225 may be configured as or otherwise support a means for transmitting an indication of a set of frequency domain resources allocated to a UE for communicating over a wireless channel. The traffic type component 1230 may be configured as or otherwise support a means for receiving an indication of a traffic type associated with communicating over the wireless channel. The waveform type component 1235 may be configured as or otherwise support a means for transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The multiple waveform communication component 1240 may be configured as or otherwise support a means for communicating within the set of frequency domain resources according to the indicated waveform type and the data type.

In some examples, to support wireless communication at a UE in accordance with examples as disclosed herein, the scheduling information component 1245 may be configured as or otherwise support a means for transmitting scheduling information associated with the direct sequence waveform type including a center frequency, a chip rate, a spreading factor, a data rate, or any combination thereof. In some examples, to support wireless communication at a UE in accordance with examples as disclosed herein, the multiple waveform communication component 1240 may be configured as or otherwise support a means for communicating within the set of frequency domain resources according to the direct sequence waveform type and the scheduling information.

In some examples, the cyclic prefix component 1250 may be configured as or otherwise support a means for processing a cyclic prefix associated with the direct sequence waveform type.

In some examples, the waveform type includes one or more of a distributed Fourier spread waveform type or an up-sampling waveform type.

In some examples, transmitting the indication of the waveform type is based on a peak to average power ratio metric associated with the UE.

In some examples, the set of multiple waveform types that are multiplexed together over different frequency domain resources within the total system bandwidth includes a combination of one or more frequency domain processing-based waveforms and one or more time domain processing-based waveforms.

In some examples, a contiguous Fourier spread waveform, an orthogonal frequency domain multiple access waveform, a frequency modulated continuous wave waveform, or any combination thereof.

In some examples, a direct sequence waveform, a resource spread multiple access waveform, an up-sampling waveform, a distributed Fourier spread waveform, a constant envelope waveform, or any combination thereof.

In some examples, the one or more time domain processing-based waveforms occupy frequency domain resources located at an edge of the total system bandwidth.

In some examples, the set of frequency domain resources occupy an entirety of a bandwidth part.

In some examples, the set of frequency domain resources occupy a portion of a bandwidth part.

Figure 13:
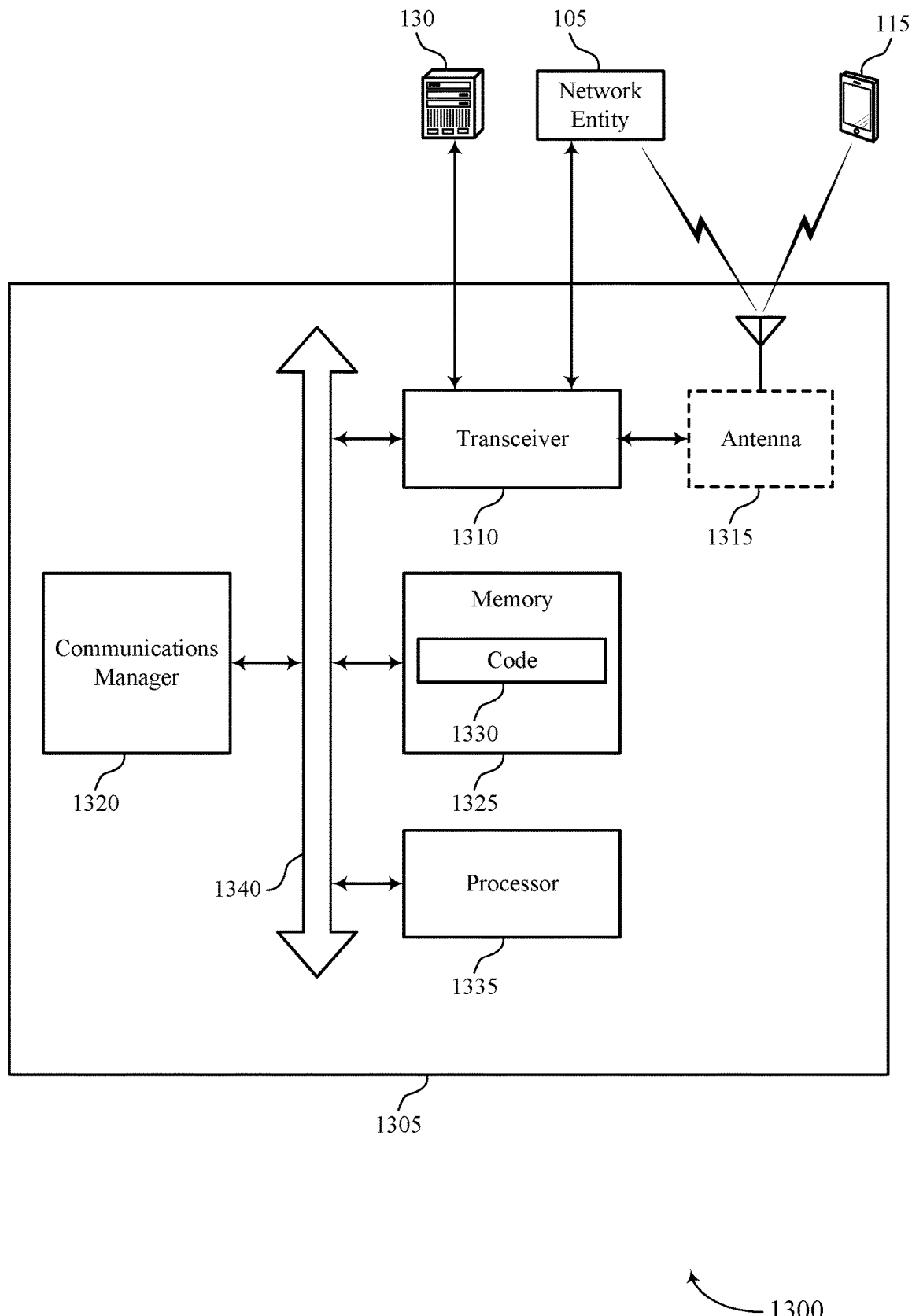
FIG. 13 shows a diagram of a system including a device that supports mixed waveform communications in accordance with one or more aspects of the present disclosure.

FIG. 13 shows a diagram of a system 1300 including a device 1305 that supports mixed waveform communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting mixed waveform communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

Additionally, or alternatively, the communications manager 1320 may support wireless communication at a network entity in accordance with examples as disclosed herein. For example, the communications manager 1320 may be configured as or otherwise support a means for transmitting an indication of a set of frequency domain resources allocated to a UE for communicating over a wireless channel. The communications manager 1320 may be configured as or otherwise support a means for receiving an indication of a traffic type associated with communicating over the wireless channel. The communications manager 1320 may be configured as or otherwise support a means for transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The communications manager 1320 may be configured as or otherwise support a means for communicating within the set of frequency domain resources according to the indicated waveform type and the data type.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of mixed waveform communications as described herein, or the processor 1335 and the memory 1325 may be otherwise configured to perform or support such operations.

Figure 14:
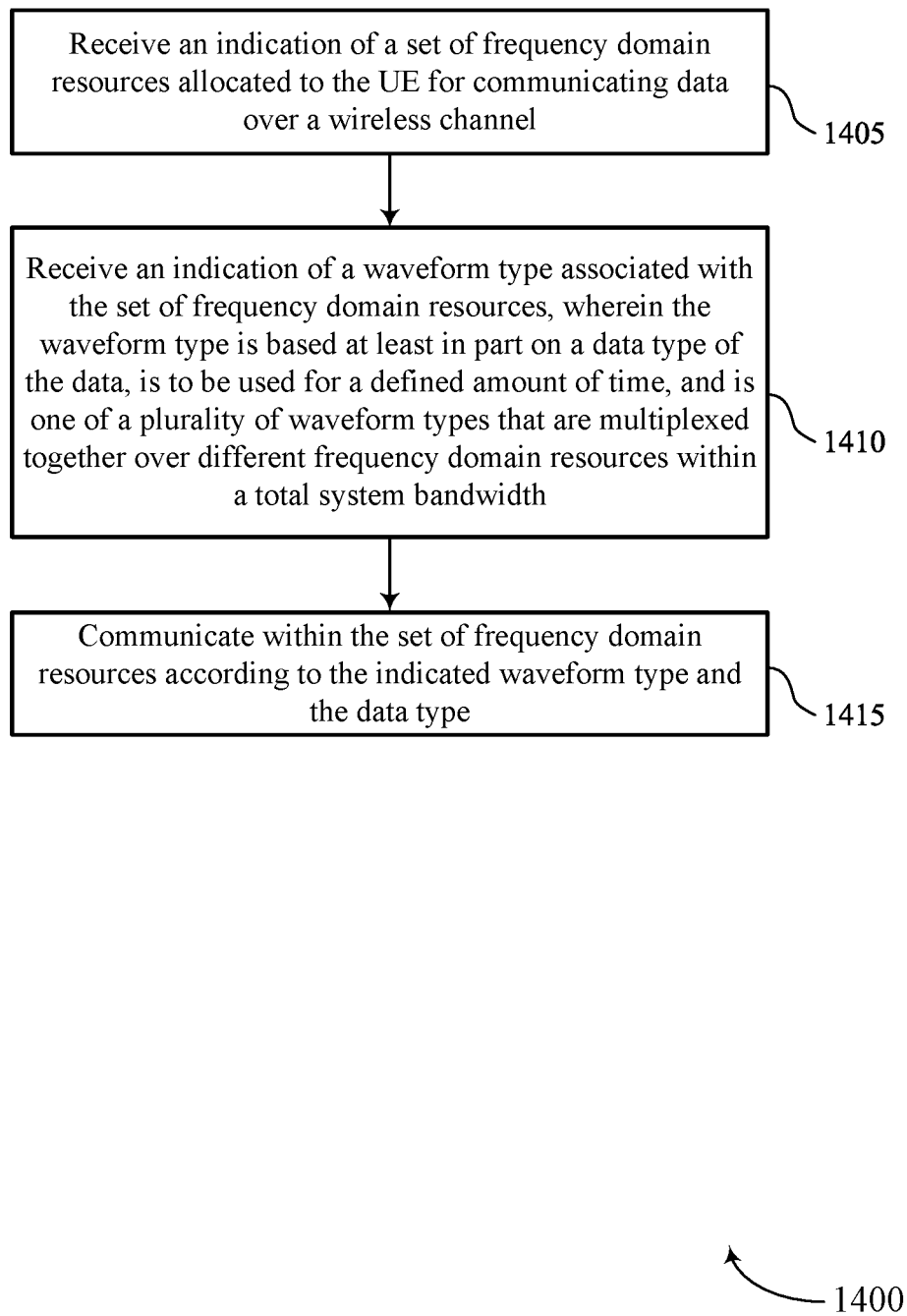
FIGS. 14 and 15 show flowcharts illustrating methods that support mixed waveform communications in accordance with one or more aspects of the present disclosure.

FIG. 14 shows a flowchart illustrating a method 1400 that supports mixed waveform communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of a set of frequency domain resources allocated to the UE for communicating data over a wireless channel. The operations of 1405 may be performed in accordance with examples as disclosed herein. In some examples, aspects of the operations of 1405 may be performed by a resource set component 825 as described with reference to FIG. 8.

At 1410, the method may include receiving an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The operations of 1410 may be performed in accordance with examples as disclosed herein. In some examples, aspects of the operations of 1410 may be performed by a waveform type component 835 as described with reference to FIG. 8.

At 1415, the method may include communicating within the set of frequency domain resources according to the indicated waveform type and the data type. The operations of 1415 may be performed in accordance with examples as disclosed herein. In some examples, aspects of the operations of 1415 may be performed by a multiple waveform communication component 840 as described with reference to FIG. 8.

Figure 15:
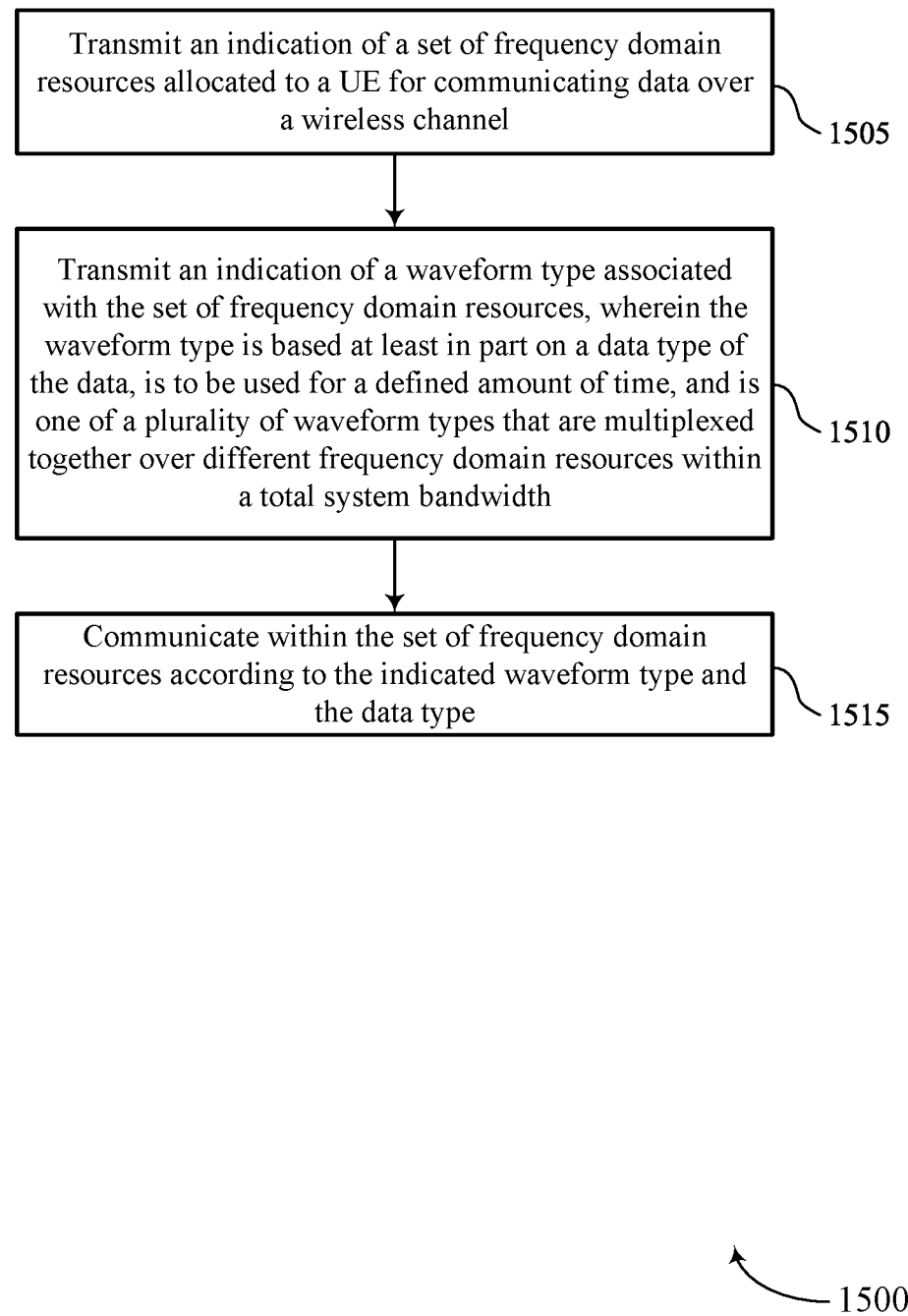

FIG. 15 shows a flowchart illustrating a method 1500 that supports mixed waveform communications in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting an indication of a set of frequency domain resources allocated to a UE for communicating over a wireless channel. The operations of 1505 may be performed in accordance with examples as disclosed herein. In some examples, aspects of the operations of 1505 may be performed by a resource set component 1225 as described with reference to FIG. 12.

At 1510, the method may include transmitting an indication of a waveform type associated with the set of frequency domain resources, where the waveform type is based on a data type of the data, is to be used for a defined amount of time, and is one of a set of multiple waveform types that are multiplexed together over different frequency domain resources within a total system bandwidth. The operations of 1510 may be performed in accordance with examples as disclosed herein. In some examples, aspects of the operations of 1510 may be performed by a waveform type component 1235 as described with reference to FIG. 12.

At 1515, the method may include communicating within the set of frequency domain resources according to the indicated waveform type and the data type. The operations of 1515 may be performed in accordance with examples as disclosed herein. In some examples, aspects of the opera-tions of 1515 may be performed by a multiple waveform communication component 1240 as described with reference to FIG. 12.

The following provides an overview of aspects of the present disclosure:

Aspect 1: A method for wireless communication at a UE, comprising: receiving an indication of a set of frequency domain resources allocated to the UE for communicating data over a wireless channel; receiving an indication of a waveform type associated with the set of frequency domain resources, wherein the waveform type is based at least in part on a data type of the data, is to be used for a defined amount of time, and is one of a plurality of waveform types that are multiplexed together over different frequency domain resources within a total system bandwidth; and communicating within the set of frequency domain resources according to the indicated waveform type and the data type.

Aspect 2: The method of aspect 1, wherein the waveform type comprises a direct sequence waveform type and the set of frequency domain resources comprises multiple contiguous subbands of the total system bandwidth, and further comprising: receiving scheduling information associated with the direct sequence waveform type comprising a center frequency, a chip rate, a spreading factor, a data rate, or any combination thereof; and communicating within the set of frequency domain resources according to the direct sequence waveform type and the scheduling information.

Aspect 3: The method of aspect 2, further comprising: processing a cyclic prefix associated with the direct sequence waveform type.

Aspect 4: The method of any of aspects 1 through 3, wherein the waveform type comprises one or more of a distributed Fourier spread waveform type or an up-sampling waveform type.

Aspect 5: The method of any of aspects 1 through 4, further comprising: receiving the indication of the waveform type is based at least in part on a peak to average power ratio metric associated with the UE.

Aspect 6: The method of any of aspects 1 through 5, wherein the plurality of waveform types that are multiplexed together over different frequency domain resources within the total system bandwidth comprises a combination of one or more frequency domain processing-based waveforms and one or more time domain processing-based waveforms.

Aspect 7: The method of aspect 6, wherein the one or more frequency domain processing-based waveforms comprise one or more of a contiguous Fourier spread waveform, an orthogonal frequency domain multiple access waveform, a frequency modulated continuous wave waveform, or any combination thereof.

Aspect 8: The method of any of aspects 6 through 7, wherein the one or more time domain processing-based waveforms comprise one or more of a direct sequence waveform, a resource spread multiple access waveform, an up-sampling waveform, a distributed Fourier spread waveform, a constant envelope waveform, or any combination thereof.

Aspect 9: The method of any of aspects 6 through 8, wherein the one or more time domain processing-based waveforms occupy frequency domain resources located at an edge of the total system bandwidth.

Aspect 10: The method of any of aspects 1 through 9, wherein the set of frequency domain resources occupy an entirety of a bandwidth part.

Aspect 11: The method of any of aspects 1 through 10, wherein the set of frequency domain resources occupy a portion of a bandwidth part.

Aspect 12: A method for wireless communication at a network entity, comprising: transmitting an indication of a set of frequency domain resources allocated to a UE for communicating data over a wireless channel; transmitting an indication of a waveform type associated with the set of frequency domain resources, wherein the waveform type is based at least in part on a data type of the data, is to be used for a defined amount of time, and is one of a plurality of waveform types that are multiplexed together over different frequency domain resources within a total system bandwidth; and communicating within the set of frequency domain resources according to the indicated waveform type and the data type.

Aspect 13: The method of aspect 12, wherein the waveform type comprises a direct sequence waveform type and the set of frequency domain resources comprises multiple contiguous subbands of the total system bandwidth, and further comprising: transmitting scheduling information associated with the direct sequence waveform type comprising a center frequency, a chip rate, a spreading factor, a data rate, or any combination thereof; and communicating within the set of frequency domain resources according to the direct sequence waveform type and the scheduling information.

Aspect 14: The method of aspect 13, further comprising: processing a cyclic prefix associated with the direct sequence waveform type.

Aspect 15: The method of any of aspects 12 through 14, wherein the waveform type comprises one or more of a distributed Fourier spread waveform type or an up-sampling waveform type.

Aspect 16: The method of any of aspects 12 through 15, wherein transmitting the indication of the waveform type is based at least in part on a peak to average power ratio metric associated with the UE.

Aspect 17: The method of any of aspects 12 through 16, wherein the plurality of waveform types that are multiplexed together over different frequency domain resources within the total system bandwidth comprises a combination of one or more frequency domain processing-based waveforms and one or more time domain processing-based waveforms.

Aspect 18: The method of aspect 17, wherein the one or more frequency domain processing-based waveforms comprise one or more of a contiguous Fourier spread waveform, an orthogonal frequency domain multiple access waveform, a frequency modulated continuous wave waveform, or any combination thereof.

Aspect 19: The method of any of aspects 17 through 18, wherein the one or more time domain processing-based waveforms comprise one or more of a direct sequence waveform, a resource spread multiple access waveform, an up-sampling waveform, a distributed Fourier spread waveform, a constant envelope waveform, or any combination thereof.

Aspect 20: The method of any of aspects 17 through 19, wherein the one or more time domain processing-based waveforms occupy frequency domain resources located at an edge of the total system bandwidth.

Aspect 21: The method of any of aspects 12 through 20, wherein the set of frequency domain resources occupy an entirety of a bandwidth part.

Aspect 22: The method of any of aspects 12 through 21, wherein the set of frequency domain resources occupy a portion of a bandwidth part.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising a processor; memory coupled with the processor; and instructions stored in the memory and executable by the processor to cause the apparatus to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory in electronic communication with the processor; and
   instructions stored in the memory, wherein the instructions are executable by the processor to:
      receive an indication of a set of frequency domain resources allocated to the UE for communicating data over a wireless channel;
      receive an indication of a waveform type associated with the set of frequency domain resources, wherein the waveform type is to be used for a defined amount of time and is one of a plurality of waveform types that are multiplexed together over different frequency domain resources within a total system bandwidth, wherein the waveform type comprises a direct sequence waveform type and the set of frequency domain resources comprises multiple contiguous subbands of the total system bandwidth;
      receive scheduling information associated with the direct sequence waveform type comprising a center frequency, a chip rate, a spreading factor, a data rate, or any combination thereof; and
      communicate within the set of frequency domain resources according to the direct sequence waveform type and the scheduling information.

2. The apparatus of claim 1, wherein the instructions are further executable by the processor to cause the apparatus to:
   process a cyclic prefix associated with the direct sequence waveform type.

3. The apparatus of claim 1, wherein receiving the indication of the waveform type is based at least in part on a peak to average power ratio metric associated with the UE.

4. An apparatus for wireless communication at a user equipment (UE), comprising:
a processor;
memory in electronic communication with the processor; and
instructions stored in the memory, wherein the instructions are executable by the processor to:
receive an indication of a set of frequency domain resources allocated to the UE for communicating data over a wireless channel;
receive an indication of a waveform type associated with the set of frequency domain resources, wherein the waveform type is based at least in part on a data type of the data, is to be used for a defined amount of time, and is one of a plurality of waveform types that are multiplexed together over different frequency domain resources within a total system bandwidth;
communicate within the set of frequency domain resources according to the indicated waveform type and the data type;
wherein the plurality of waveform types that are multiplexed together over different frequency domain resources within the total system bandwidth comprises a combination of one or more frequency domain processing-based waveforms and one or more time domain processing-based waveforms; and
wherein:
the one or more frequency domain processing-based waveforms comprise one or more of a contiguous Fourier spread waveform, an orthogonal frequency domain multiple access waveform, a frequency modulated continuous wave waveform, or any combination thereof;
the one or more time domain processing-based waveforms comprise one or more of a direct sequence waveform, a resource spread multiple access waveform, an up-sampling waveform, a distributed Fourier spread waveform, a constant envelope waveform, or any combination thereof; or
the one or more time domain processing-based waveforms occupy frequency domain resources located at an edge of the total system bandwidth.

5. An apparatus for wireless communication at a network entity, comprising:
a processor;
memory in electronic communication with the processor; and
instructions stored in the memory, wherein the instructions are executable by the processor to:
transmit an indication of a set of frequency domain resources allocated to a user equipment (UE) for communicating data over a wireless channel;
transmit an indication of a waveform type associated with the set of frequency domain resources, wherein the waveform type is to be used for a defined amount of time and is one of a plurality of waveform types that are multiplexed together over different frequency domain resources within a total system bandwidth, wherein the waveform type comprises a direct sequence waveform type and the set of frequency domain resources comprises multiple contiguous subbands of the total system bandwidth;
transmit scheduling information associated with the direct sequence waveform type comprising a center frequency, a chip rate, a spreading factor, a data rate, or any combination thereof; and
communicate within the set of frequency domain resources according to the direct sequence waveform type and the scheduling information.

6. The apparatus of claim 5, wherein the instructions are further executable by the processor to cause the apparatus to process a cyclic prefix associated with the direct sequence waveform type.

7. The apparatus of claim 5, wherein transmitting the indication of the waveform type is based at least in part on a peak to average power ratio metric associated with the UE.

8. An apparatus for wireless communication at a network entity, comprising:
a processor:
memory in electronic communication with the processor; and
instructions stored in the memory, wherein the instructions are executable by the processor to:
transmit an indication of a set of frequency domain resources allocated to a user equipment (UE) for communicating data over a wireless channel;
transmit an indication of a waveform type associated with the set of frequency domain resources, wherein the waveform type is based at least in part on a data type of the data, is to be used for a defined amount of time, and is one of a plurality of waveform types that are multiplexed together over different frequency domain resources within a total system bandwidth;
communicate within the set of frequency domain resources according to the indicated waveform type and the data type;
wherein the plurality of waveform types that are multiplexed together over different frequency domain resources within the total system bandwidth comprises a combination of one or more frequency domain processing-based waveforms and one or more time domain processing-based waveforms; and
wherein:
the one or more frequency domain processing-based waveforms comprise one or more of a contiguous Fourier spread waveform, an orthogonal frequency domain multiple access waveform, a frequency modulated continuous wave waveform, or any combination thereof;
the one or more time domain processing-based waveforms comprise one or more of a direct sequence waveform, a resource spread multiple access waveform, an up-sampling waveform, a distributed Fourier spread waveform, a constant envelope waveform, or any combination thereof; or
the one or more time domain processing-based waveforms occupy frequency domain resources located at an edge of the total system bandwidth.

9. A method for wireless communication at a network entity, comprising:
transmitting an indication of a set of frequency domain resources allocated to a user equipment (UE) for communicating data over a wireless channel;
transmitting an indication of a waveform type associated with the set of frequency domain resources, wherein the waveform type is to be used for a defined amount of time and is one of a plurality of waveform types that are multiplexed together over different frequency domain resources within a total system bandwidth, wherein the waveform type comprises a direct sequence waveform type and the set of frequency domain resources comprises multiple contiguous subbands of the total system bandwidth;
transmitting scheduling information associated with the direct sequence waveform type comprising a center frequency, a chip rate, a spreading factor, a data rate, or any combination thereof; and
communicating within the set of frequency domain resources according to the direct sequence waveform type and the scheduling information.

10. A method for wireless communication at a user equipment (UE), comprising:
receiving an indication of a set of frequency domain resources allocated to the UE for communicating data over a wireless channel;
receiving an indication of a waveform type associated with the set of frequency domain resources, wherein the waveform type is based at least in part on a data type of the data, is to be used for a defined amount of time, and is one of a plurality of waveform types that are multiplexed together over different frequency domain resources within a total system bandwidth;
communicating within the set of frequency domain resources according to the indicated waveform type and the data type;
wherein the plurality of waveform types that are multiplexed together over different frequency domain resources within the total system bandwidth comprises a combination of one or more frequency domain processing-based waveforms and one or more time domain processing-based waveforms; and
wherein:
the one or more frequency domain processing-based waveforms comprise one or more of a contiguous Fourier spread waveform, an orthogonal frequency domain multiple access waveform, a frequency modulated continuous wave waveform, or any combination thereof;
the one or more time domain processing-based waveforms comprise one or more of a direct sequence waveform, a resource spread multiple access waveform, an up-sampling waveform, a distributed Fourier spread waveform, a constant envelope waveform, or any combination thereof; or
the one or more time domain processing-based waveforms occupy frequency domain resources located at an edge of the total system bandwidth.

11. The method of claim 9, further comprising:
processing a cyclic prefix associated with the direct sequence waveform type.

12. The method of claim 11, further comprising processing a cyclic prefix associated with the direct sequence waveform type.

13. A method for wireless communication at a network entity, comprising:
transmitting an indication of a set of frequency domain resources allocated to a user equipment (UE) for communicating data over a wireless channel;
transmitting an indication of a waveform type associated with the set of frequency domain resources, wherein the waveform type is based at least in part on a data type of the data, is to be used for a defined amount of time, and is one of a plurality of waveform types that are multiplexed together over different frequency domain resources within a total system bandwidth; and
communicating within the set of frequency domain resources according to the indicated waveform type and the data type;
wherein the plurality of waveform types that are multiplexed together over different frequency domain resources within the total system bandwidth comprises a combination of one or more frequency domain processing-based waveforms and one or more time domain processing-based waveforms; and
wherein:
the one or more frequency domain processing-based waveforms comprise one or more of a contiguous Fourier spread waveform, an orthogonal frequency domain multiple access waveform, a frequency modulated continuous wave waveform, or any combination thereof;
the one or more time domain processing-based waveforms comprise one or more of a direct sequence waveform, a resource spread multiple access waveform, an up-sampling waveform, a distributed Fourier spread waveform, a constant envelope waveform, or any combination thereof; or
the one or more time domain processing-based waveforms occupy frequency domain resources located at an edge of the total system bandwidth.

* * * * *